US012776859B2

(12) United States Patent
Takahashi et al.

(10) Patent No.: US 12,776,859 B2
(45) Date of Patent: Oct. 27, 2026

(54) COMMUNICATION DEVICE AND COMMUNICATION METHOD

(71) Applicant: NTT DOCOMO, INC., Tokyo (JP)

(72) Inventors: Yuki Takahashi, Tokyo (JP); Shinya Kumagai, Tokyo (JP); Shohei Yoshioka, Tokyo (JP); Masaya Okamura, Tokyo (JP); Mayuko Okano, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 390 days.

(21) Appl. No.: 18/275,122

(22) PCT Filed: Mar. 12, 2021

(86) PCT No.: PCT/JP2021/010254
§ 371 (c)(1),
(2) Date: Jul. 31, 2023

(87) PCT Pub. No.: WO2022/190394
PCT Pub. Date: Sep. 15, 2022

(65) Prior Publication Data
US 2024/0129065 A1 Apr. 18, 2024

(51) Int. Cl.
*H04L 1/08* (2006.01)
*H04L 5/00* (2006.01)

(52) U.S. Cl.
CPC .............. *H04L 1/08* (2013.01); *H04L 5/0053* (2013.01)

(58) Field of Classification Search
CPC ....... H04L 1/08; H04L 5/0053; H04L 1/0003; H04L 1/0009; H04L 1/0027; H04L 1/0031; H04L 1/1671; H04L 1/1819; H04L 1/1887; H04L 5/0094; H04L 5/0033; H04W 52/146; H04W 74/0808; H04W 72/02
See application file for complete search history.

(56) References Cited

U.S. PATENT DOCUMENTS

| | | | |
|---|---|---|---|
| 2019/0053251 A1 | 2/2019 | Loehr et al. | |
| 2020/0022188 A1 | 1/2020 | Lee et al. | |
| 2020/0146044 A1 | 5/2020 | Maaref et al. | |
| 2022/0104253 A1* | 3/2022 | Xiong | H04W 74/0808 |

(Continued)

FOREIGN PATENT DOCUMENTS

| | | |
|---|---|---|
| EP | 3751767 A1 | 12/2020 |
| JP | 2017508400 A | 3/2017 |

(Continued)

OTHER PUBLICATIONS

Extended European Search Report issued in counterpart European Application No. 21930244.5 mailed on Oct. 24, 2024 (10 pages).

(Continued)

*Primary Examiner* — Yaotang Wang
(74) *Attorney, Agent, or Firm* — Osha Bergman Watanabe & Burton LLP

(57) ABSTRACT

A communication device has: a control unit configured to determine a coding-related parameter to apply to a data signal; and a transmitting unit configured to transmit the determined coding-related parameter, and the data signal to which the coding-related parameter is applied, in autonomously selected resources, to another communication device.

4 Claims, 42 Drawing Sheets

(56) References Cited

U.S. PATENT DOCUMENTS

| | | | | |
|---|---|---|---|---|
| 2022/0132495 | A1* | 4/2022 | Bae | H04W 72/21 |
| 2024/0137146 | A1* | 4/2024 | Yoshimura | H04L 1/189 |

FOREIGN PATENT DOCUMENTS

| | | | |
|---|---|---|---|
| JP | 2019-508931 | A | 3/2019 |
| JP | 2020511060 | A | 4/2020 |

OTHER PUBLICATIONS

Intel Corporation; "NOMA related procedure"; 3GPP TSG RAN WG1 Meeting #92bis, R1-1804745; Sanya, China; Apr. 16-20, 2018 (8 pages).

Qualcomm Incorporated; "Autonomous UL transmission in NR unlicensed"; 3GPP TSG RAN WG1 Meeting #92bis, R1-1804832; Sanya, China; Apr. 16-20, 2018 (7 pages).

Office Action issued in Japanese Patent Application No. 2023-505076, issued Apr. 30, 2025 (7 pages).

Office Action issued in Japanese Patent Application No. 2023-505076, dated Nov. 12, 2024 (7 pages).

International Search Report issued in PCT/JP2021/010254 on Oct. 12, 2021 (5 pages).

Written Opinion of the International Searching Authority issued in PCT/JP2021/010254 on Oct. 12, 2021 (4 pages).

3GPP TS 38.300 V16.4.0; "3rd Generation Partnership Project; Technical Specification Group Radio Access Network; NR; NR and NG-RAN Overall Description; Stage 2 (Release 16)"; Dec. 2020 (149 pages).

"White Paper 5G Evolution and 6G", Jan. 2020, NTT Docomo, Inc. (17 pages).

Office Action issued in counterpart Chinese Patent Application No. 202180094026.5 mailed on Jul. 18, 2026 (13 pages).

* cited by examiner

COMMUNICATION DEVICE AND COMMUNICATION METHOD

FIELD OF THE INVENTION

The present invention relates to a communication device and a communication method in a wireless communication system.

BACKGROUND OF THE INVENTION

In the 3rd generation partnership project (3GPP), a wireless communication scheme called "5G" or "New Radio (NR)" (hereinafter this new communication scheme will be referred to as "NR") is being discussed in order to realize further increase of system capacity, further increase of data transmission speed, and further decrease of delay in wireless sections. In 5G, various wireless technologies and network architectures are being discussed in order to satisfy the requirements of achieving a throughput of 10 Gbps or more and keeping the delay in wireless sections to 1 ms or less (see, for example, Non-Patent Document 1).

Furthermore, studies on 6G as a next-generation wireless communication scheme following 5G have started, and realizing wireless quality exceeding that of 5G is expected. For example, studies on 6G are in progress to realize further increase of capacity, use of new frequency bands, further reduction of delay, higher reliability, expansion of coverage in new areas (high altitude, sea, outer space, etc.), and so forth (see, for example, Non-Patent Document 2).

RELATED-ART DOCUMENTS

Non-Patent Documents

[Non-Patent Document 1] 3GPP TS 38.300 V16.4.0 (2020-12)

[Non-Patent Document 2] NTT DOCOMO, INC. White Paper: 5G Evolution and 6G (2020-01)

SUMMARY OF THE INVENTION

Technical Problem

In 6G, frequencies higher than heretofore might be used for further improvement of communication speed, capacity, reliability, delay performance, and so forth. Characteristics that are demonstrated when such high frequencies are used include that a wide bandwidth can be used, that the straightness of radio waves is high, and that the frequency selectivity is low. Also, large Doppler shift and large path loss are additional examples of such characteristics.

Given these characteristics of frequency bands when high frequencies are used, control rules that are different from conventional cell design or scheduling techniques by base stations may be more desirable from the perspective of network performance. For example, since the probability of resource collision is likely to be lower than in the past, a system in which a terminal or a base station autonomously selects the resources to use for transmission may be possible. It is necessary to specify how to determine transmission parameters in this system.

The present invention has been made in view of the foregoing, and aims to determine transmission parameters in a wireless communication system in which the resources to be used are determined autonomously.

Solution to Problem

According to the technique disclosed herein, a communication device is provided. This communication device includes: a control unit configured to determine a coding-related parameter to apply to a data signal; and a transmitting unit configured to transmit the determined coding-related parameter, and the data signal to which the coding-related parameter is applied, in autonomously selected resources, to another communication device.

Advantageous Effects of Invention

According to the technique disclosed herein, transmission parameters can be determined in a wireless communication system in which the resources to be used are determined autonomously.

DETAILED DESCRIPTION OF THE PREFERRED EMBODIMENTS

Hereinafter, an embodiment of the present invention will be described with reference to the accompanying drawings. The embodiment described below is an example, and the embodiments to which the present invention can be applied are by no means limited to the following embodiment.

Existing technologies may be used as appropriate for the operation of the wireless communication system according to the following embodiment of the present invention. The existing technologies include, for example, existing NR or LTE, but are by no means limited to existing NR or LTE.

Figure 1:
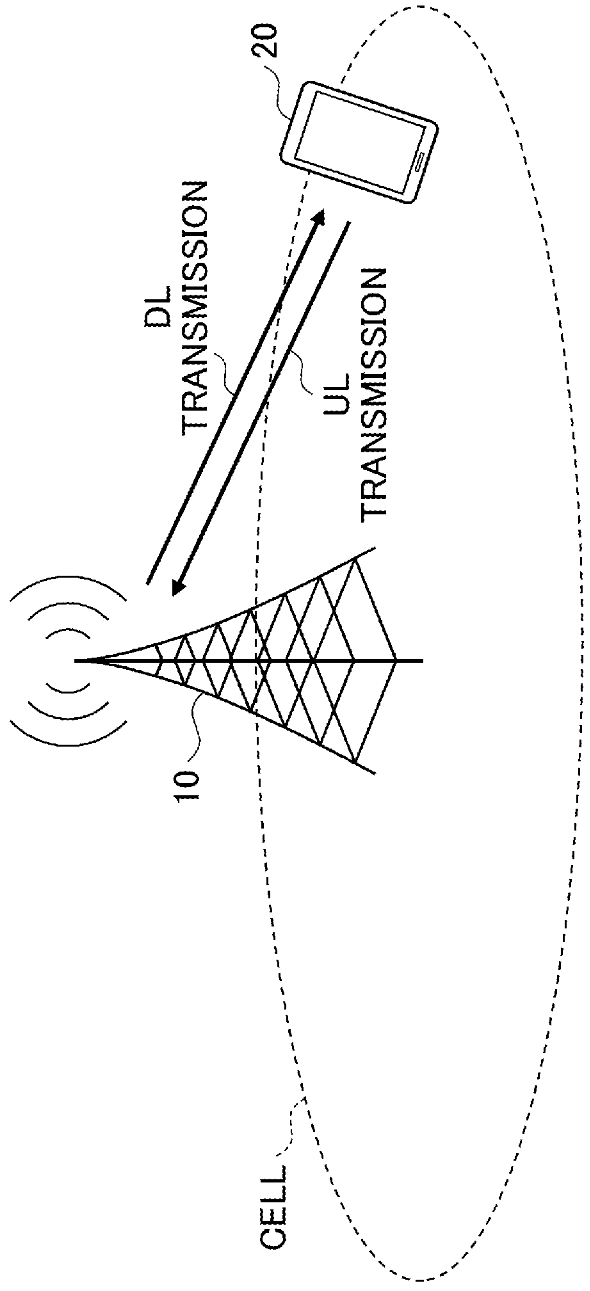
FIG. 1 is a diagram that illustrates an example (1) of a wireless communication system according to an embodiment of the present invention.

FIG. 1 is a diagram that illustrates an example (1) of a wireless communication system according to an embodiment of the present invention. The wireless communication system according to the embodiment of the present invention includes a base station 10 and a terminal 20, as illustrated in FIG. 1. In FIG. 1, one base station 10 and one terminal 20 are illustrated, but this is an example, and there may be more than one of each.

The base station 10 is a communication device that provides one or more cells and performs wireless communication with the terminal 20. The physical resources of radio signals are defined in the time domain and the frequency domain. The time domain resources may be defined or referred to as orthogonal frequency division multiplexing (OFDM) symbols, and the frequency domain resources may be defined or referred to as sub-carriers or resource blocks. Also, the transmission time interval (TTI) in the time domain may be a slot or a subframe.

The base station 10 can perform carrier aggregation to communicate with the terminal 20 by bundling multiple cells (multiple component carriers (CCs)). Carrier aggregation uses one primary cell (PCell) and one or more secondary cells (SCells).

The base station 10 transmits synchronization signals, system information, and so forth to the terminal 20. The synchronization signals are, for example, the primary synchronization signal (NR-PSS) and the secondary synchronization signal (NR-SSS). The system information is transmitted, for example, by NR-PBCH or PDSCH, and is also referred to as "broadcast information." As illustrated in FIG. 1, the base station 10 transmits control signals or data to the terminal 20 in the downlink (DL), and receives control signals or data from the terminal 20 in the uplink (UL). Here, although what is transmitted via control channels such as PUCCH and PDCCH is referred to as "control signals" and what is transmitted via shared channels such as PUSCH and PDSCH is referred to as "data," these names are only examples.

The terminal 20 is a communication device with a wireless communication function, such as a smartphone, a cellular phone, a tablet, a wearable terminal, or a machine-to-machine (M2M) communication module. As illustrated in FIG. 1, the terminal 20 utilizes various communication services provided by a wireless communication system by receiving control signals or data from the base station 10 in DL and by transmitting control signals or data to the base station 10 in UL. Note that the terminal 20 may be referred to as a "UE," and the base station 10 may be referred to as a "gNB."

The terminal 20 can perform carrier aggregation to communicate with the base station 10 by bundling multiple cells (multiple CCs). Carrier aggregation uses one PCell and one or more SCells. Also, PUCCH-SCell with PUCCH may be used.

Figure 2:
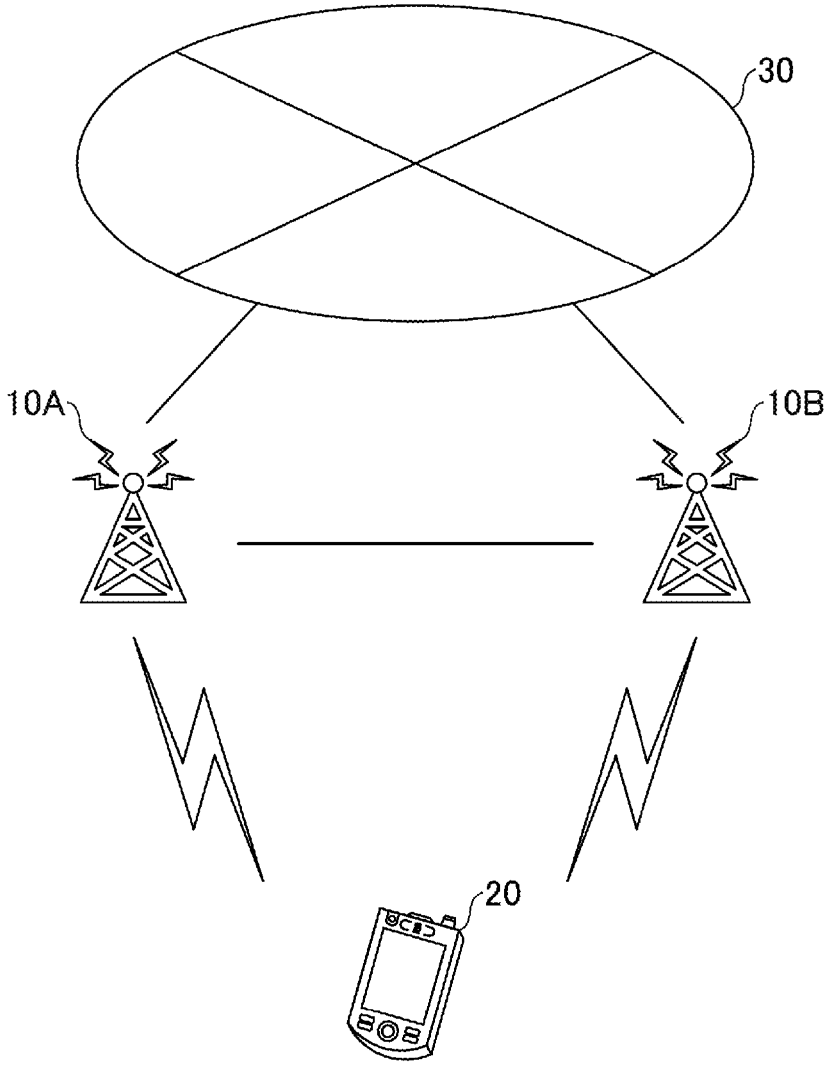
FIG. 2 is a diagram that illustrates an example (2) of a wireless communication system according to an embodiment of the present invention.

FIG. 2 is a diagram for explaining an example (2) of the wireless communication system according to an embodiment of the present invention. FIG. 2 shows an example structure of a wireless communication system in which dual connectivity (DC) is employed. As illustrated in FIG. 2, a base station 10A that serves as a master node (MN) and a base station 10B that serves as a secondary node (SN) are provided. The base station 10A and the base station 10B are both connected to a core network. The terminal 20 can communicate with both the base station 10A and the base station 10B.

The cell group provided by the base station 10A that serves as the MN is referred to as a "master cell group" (MCG), and the cell group provided by the base station 10B that serves as the SN is referred to as a "secondary cell group" (SCG). Also, in DC, the MCG is composed of one PCell and one or more SCells, and the SCG is composed of one primary SCG cell (PSCell) and one or more SCells.

Note that DC may be a communication method in compliance with two communication standards, and any combination of communication standards is possible. For example, either NR and 6G standards may be combined, or LTE and 6G standards may be combined. Also, DC may be a communication method in compliance with three or more communication standards, and may be referred to by a name other than DC.

The processes and operations according to the present embodiment may be executed in the system structure illustrated in FIG. 1, may be executed in the system structure illustrated in FIG. 2, or may be executed in a system structure other than these.

Now, in 6G, frequencies higher than heretofore might be used for further improvement of communication speed, capacity, reliability, delay performance, and so forth. Characteristics that are demonstrated when such high frequencies are used include that a wide bandwidth can be used, that the straightness of radio waves is high, and that the frequency selectivity is low. Also, large Doppler shift and large path loss are additional examples of such characteristics.

Given these characteristics of frequency bands when high frequencies are used, control rules that are different from conventional cell design or scheduling techniques by base stations may be more desirable from the perspective of network performance. For example, DL-DL, DL-UL, and UL-UL collision avoidance and inter-cell interference reduction may be less necessary than in low frequencies used heretofore.

Figure 3:
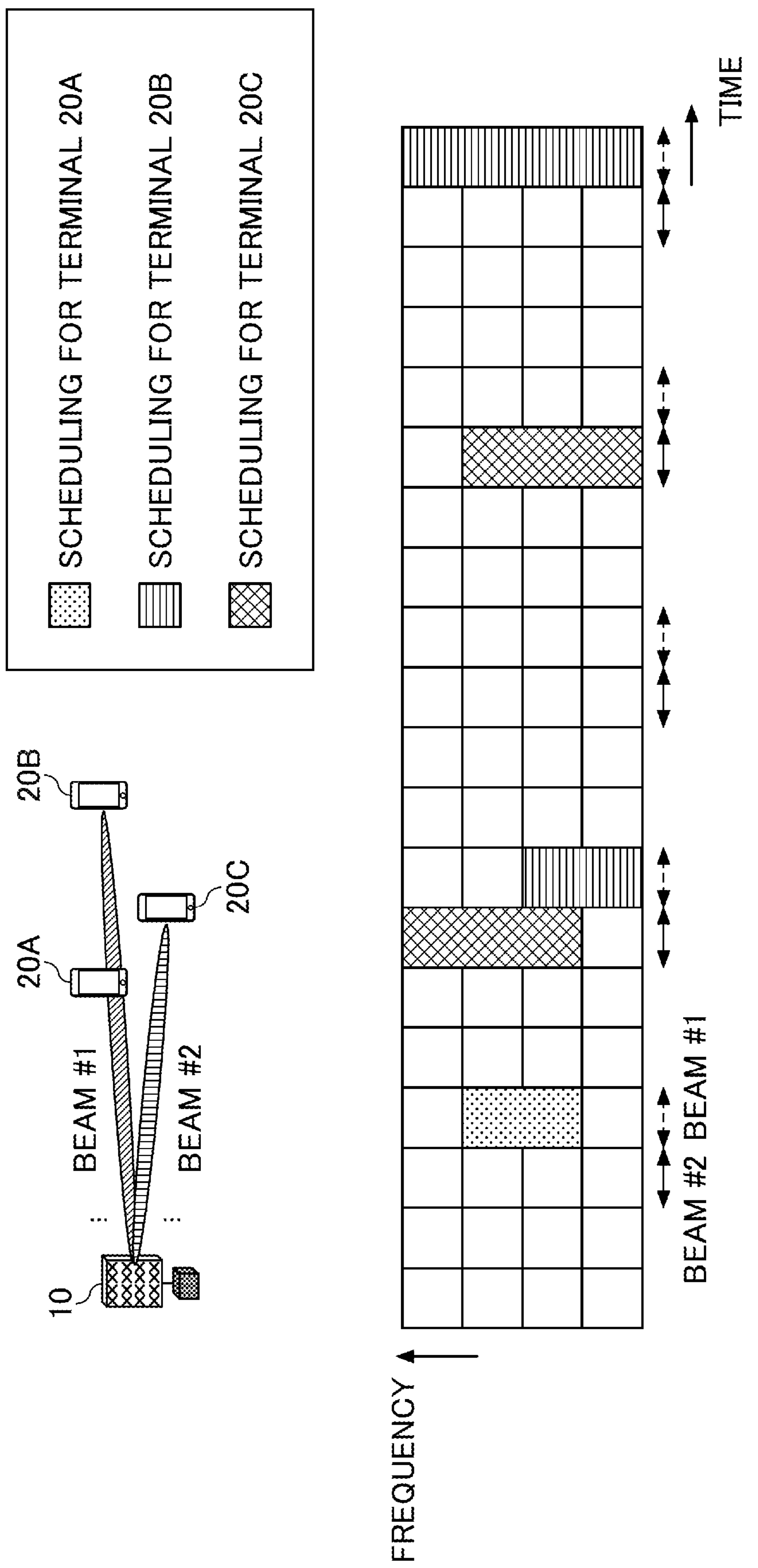
FIG. 3 is a diagram that illustrates an example of scheduling.

FIG. 3 is a diagram that illustrates an example of scheduling. In the example illustrated in FIG. 3, analog beamforming of the base station 10 is realized, and scheduling is performed based on time division multiplexing (TDM) for each beam. As illustrated in FIG. 3, beam #1 and beam #2 are multiplexed by TDM. In the example illustrated in FIG. 3, the base station 10 performs TDM-based scheduling for the terminals 20A and 20B that use beam #1 and for the terminal 20C that uses beam #2.

As control rules that do not rely on scheduling, for example, a control rule (A) and a control rule (B) shown below may be used:

Control Rule (A):

The transmitting device, either the base station 10 or the terminal 20, transmits signals at freely-selected timings. The receiving device, either the base station 10 or the terminal 20, needs to detect signals at all possible receiving timings. If the resources to use for transmission collide, the collision is treated the same as a decoding error, and feedback-triggered retransmission may be performed. In a frequency band using a higher frequency than heretofore, the beams are very narrow and the area is narrow. It then follows that the number of terminals 20 located in a given beam is very small, and, even if scheduling is not executed by the base station 10, the probability of collision of resources used for transmission is likely to be low.

Control Rule (B):

The transmitting device, either the base station 10 or the terminal 20, acquires the right for transmission and transmits signals. That is, the base station 10 and the terminal 20 transmit signals after executing intra-system listen before talk (LBT). The receiving device, either the base station 10 or the terminal 20, needs to detect signals at all possible receiving timings. Collisions of resources used for transmission can be avoided by performing intra-system LBT. In a frequency band using a higher frequency than heretofore, the probability of resource collisions is low, and, in addition to this, control rule B can ensure operations in which resource collisions that rarely occur due to interference within the same beam or between cells can be detected in advance and avoided.

For each of control rule A and control rule B, a case with frame synchronization and a case without frame synchronization may be considered. Hereinafter, control rules with frame synchronization will be referred to as a "control rule A1" and a "control rule B1," and control rules without frame synchronization will be referred to as a "control rule A2" and a "control rule B2."

The transmission procedures and signal detection procedures in above control rule A1, control rule A2, control rule B1, and control rule B2 need to be considered. Also, intra-system LBT in above control rule B1 and control rule B2 needs to be considered. As for the elements of intra-system LBT, the possible transmission time, semi-static transmission without LBT, and frequency resource collision avoidance need to be considered. Also, for above control rule A2 and control rule B2, the use of preambles needs to be considered. Also, for above control rule A1 and control rule B1, it is necessary to consider blind detection of control signals.

Note that, hereinafter, the transmitting node or the receiving node corresponds to either the base station 10 or the terminal 20.

Figure 4:
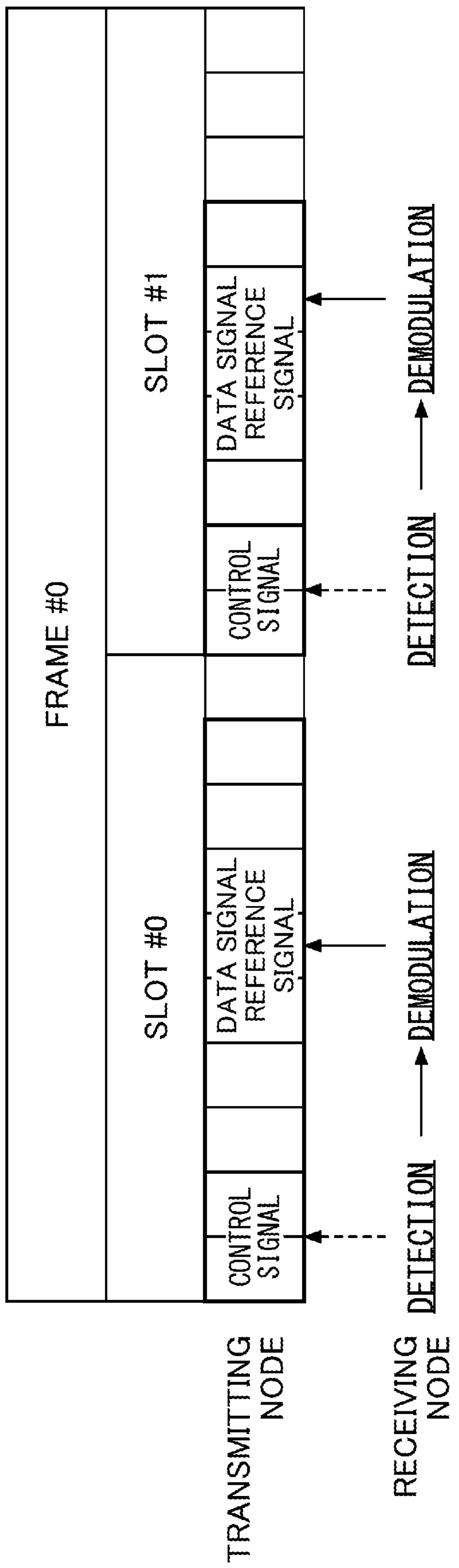
FIG. 4 is a diagram that illustrates an example (1) of transmission and reception according to an embodiment of the present invention.

FIG. 4 is a diagram that illustrates an example (1) of transmission and reception according to an embodiment of the present invention. Procedures relating to above control rule A1 will be described below with reference to FIG. 4. In above control rule A1, the following operations (1) to (4) may be executed.

(1) The transmitting node may transmit a signal at a predetermined transmission timing. The transmitting signal may include at least one of a data signal, a control signal, and a reference signal. The predetermined transmission timing may be determined based on a frame that is synchronized between the transmitting/receiving nodes.

(2) When the transmitting node transmits a number of signals continuously, except for the first transmission, the timing for transmitting a signal may be determined based on the signal transmitted immediately before. For example, the transmission timings and the duration of transmission for signals other than the signal of the first transmission may be commanded to the transmitting node or configured in advance in the transmitting node, or may be notified to the receiving node or configured in advance in the receiving node. For example, the transmission timing of a transmission other than the first transmission may be x symbols after the end of the signal transmitted immediately before, y slots after the end of the signal transmitted immediately before, z frames after the end of the signal transmitted immediately before, or may be a combination of x, y, and z. For example, the duration of transmission in transmissions other than the first transmission may be L symbols long from the x-th symbol in each slot.

In the example illustrated in FIG. 4, assuming that the first transmission is performed in slot #0, the transmission in slot #1 is carried out at a timing one symbol after the end of the signal transmitted immediately before, with its transmission timing and duration of transmission being the 0th symbol of the slot and 7 symbols long, respectively.

(3) The receiving node may perform blind detection of the control signals. Control signal resources or detection opportunities (for example, a control resource set (CORESET) or search space) may be defined in the technical specifications, or may be configured or notified from the transmitting node. For example, in FIG. 4, the receiving node performs blind detection for the control signal transmitted in the first two symbols of the slot.

(4) The receiving node may demodulate the data signal upon detection of the control signal. The receiving node may specify the data and/or reference signal resources based on the detection result of the control signal. For example, referring to FIG. 4, when the receiving node detects the control signal transmitted in the first two symbols of the slot, the receiving node may demodulate the subsequent data signal and/or reference signal.

Note that the correspondence between the transmitting/receiving nodes is as follows. In the downlink, the base station 10 is the transmitting node, and the terminal 20 is the receiving node. In the uplink, the terminal 20 is the transmitting node, and the base station 10 is the receiving node. In the sidelink, the terminal 20 is the transmitting node, and the terminal 20 is the receiving node.

Figure 5:
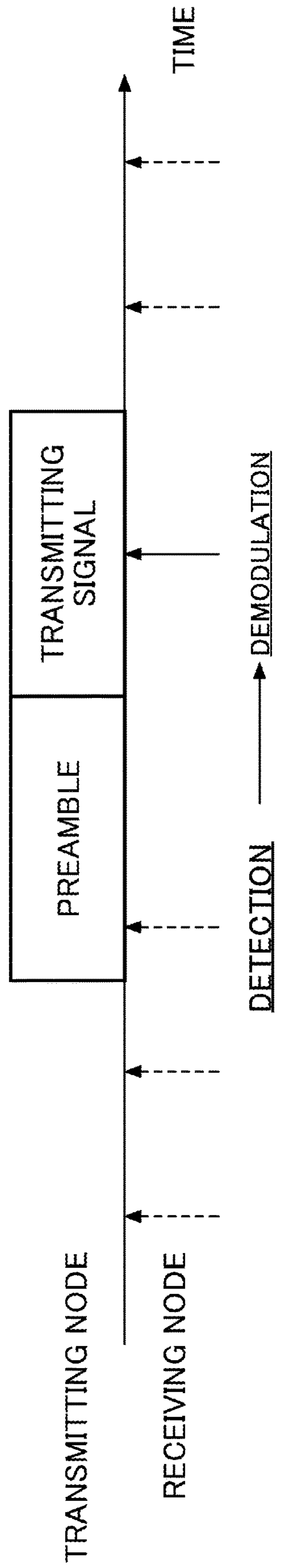
FIG. 5 is a diagram that illustrates an example (2) of transmission and reception according to an embodiment of the present invention.

FIG. 5 is a diagram that illustrates an example (2) of transmission and reception according to an embodiment of the present invention. Procedures pertaining to above control rule A2 will be described below with reference to FIG. 5. The following operations (1) to (4) may be executed in above control rule A2.

(1) As illustrated in FIG. 5, the transmitting node may attach a preamble signal to a transmitting signal and transmit it. The transmitting signal may include at least one of a data signal, a control signal, and a reference signal. The transmitting node may start transmitting the signal at any timing.

(2) In the event the transmitting node transmits a number of signals continuously and the gap between the transmitting signals is less than or equal to a predetermined value, the transmitting node need not attach the preamble signal in transmissions other than the first transmission. The predetermined value may be a threshold. Except for the first transmission, the timing for transmitting a signal may be determined based on the immediately preceding transmitting signal. For example, the next signal may start being transmitted X milliseconds after the end of the signal transmitted immediately before.

(3) The receiving node may detect the preamble signal. The receiving node may determine that a preamble is detected when the receiving power of the preamble signal is greater than or equal to a predetermined value.

(4) The receiving node may demodulate the transmitting signal upon detecting the preamble signal. The receiving node may specify the resources of the transmitting signal based on the preamble signal's detection result. The receiving node may specify the control signal's resources or detection opportunities (for example, a CORESET or search space) based on the detection result of the preamble signal, and perform blind detection for the control signal. Furthermore, the receiving node may demodulate the data signal upon detecting the control signal. The receiving node may specify the data and/or reference signal resources from the detection result of the control signal.

Figure 6:
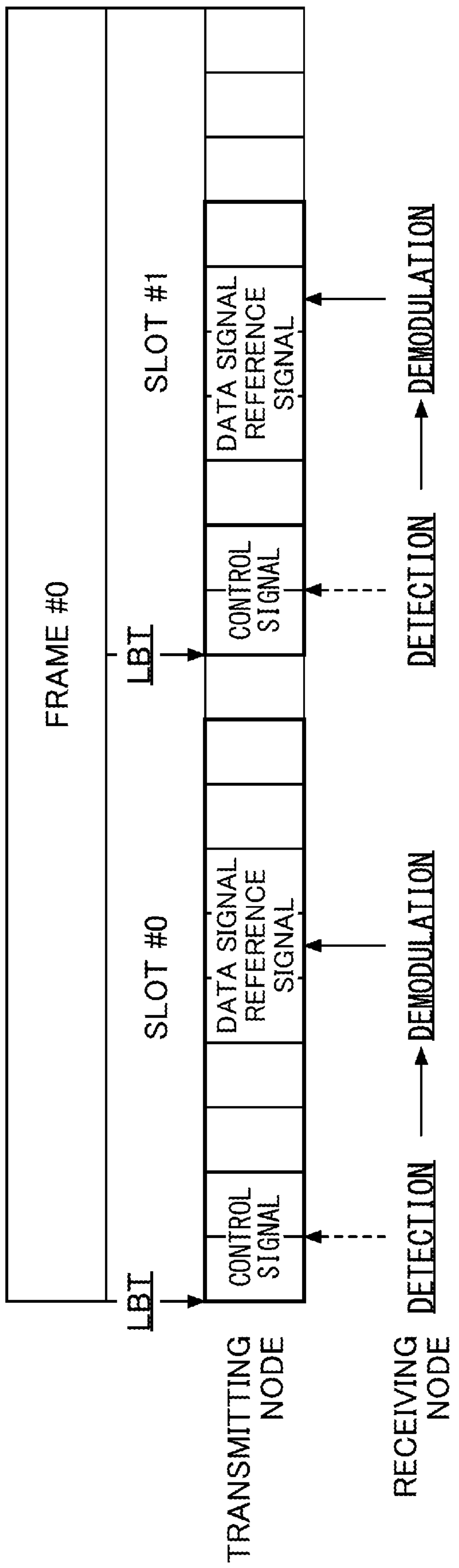
FIG. 6 is a diagram that illustrates an example (3) of transmission and reception according to an embodiment of the present invention.

FIG. 6 is a diagram that illustrates an example (3) of transmission and reception according to an embodiment of the present invention. Procedures pertaining to above control rule B1 will be described with reference to FIG. 6. In above control rule B1, the following operations (1) to (4) may be executed.

(1) The transmitting node may transmit a transmitting signal when LBT succeeds at a predetermined transmission timing. For example, as illustrated in FIG. 6, LBT may be performed until shortly before a signal-transmitting slot. The transmitting signal may include at least one of a data signal, a control signal, and a reference signal. The predetermined transmission timing may be determined based on a frame that is synchronized between the transmitting/receiving nodes. When LBT is performed, the power may be detected in a predetermined time period immediately before the transmitting signal is transmitted, and it may be determined that LBT succeeded if the receiving power there is less than or equal to a predetermined value. The predetermined value may be a threshold. When LBT fails, LBT may be performed again shortly before a predetermined transmission timing. Alternatively, the timing for repeating LBT until LBT succeeds may be specified in the technical specifications, or may be configured or notified in advance from the receiving node. Note that, if the transmitting node performs LBT again and succeeds, the transmitting node may transmit the same transmitting signal as when LBT failed, or the transmitting node may transmit a different transmitting signal than when LBT failed.

(2) In the event the transmitting node transmits a number of signals continuously and the gap between transmitting signals is less than or equal to a predetermined value, the transmitting node may not perform LBT except upon the first transmission. That is, if the gap between a signal that has been transmitted and the signal that is going to be transmitted next is less than or equal to a predetermined value, then the next signal may be transmitted without performing LBT. The predetermined value may be a threshold. In the event LBT succeeds when a number of signals are transmitted continuously, the transmitting node may perform transmission without performing LBT for a predetermined period of time. When a plurality of transmitting signals are transmitted continuously, except for the first transmission, the timing for transmitting a signal may be determined based on the signal transmitted immediately before. When a number of transmitting signals are transmitted continuously, the transmission timings and the duration of transmission for signals other than the signal of the first transmission may be commanded to the transmitting node or configured in advance in the transmitting node, or may be notified to the receiving node or configured in advance in the receiving node. For example, the transmission timing of a transmission other than the first transmission may be x symbols after the end of the signal transmitted immediately before, y slots after the end of the signal transmitted immediately before, z frames after the end of the signal transmitted immediately before, or may be a combination of x, y, and z. For example, the duration of transmission in transmissions other than the first transmission may be L symbols long from the x-th symbol in each slot.

(3) The receiving node may perform blind detection of the control signals. Control signal resources or detection opportunities (for example, a CORESET or search space) may be defined in the technical specifications, or may be configured or notified from the transmitting node. For example, in FIG. 6, the receiving node performs blind detection for the control signal transmitted in the first two symbols of the slot.

(4) The receiving node may demodulate the data signal upon detection of the control signal. The receiving node may specify the data and/or reference signal resources based on the detection result of the control signal. For example, referring to FIG. 6, when the receiving node detects the control signal transmitted in the first two symbols of the slot, the receiving node may demodulate the subsequent data signal and/or reference signal.

Figure 7:
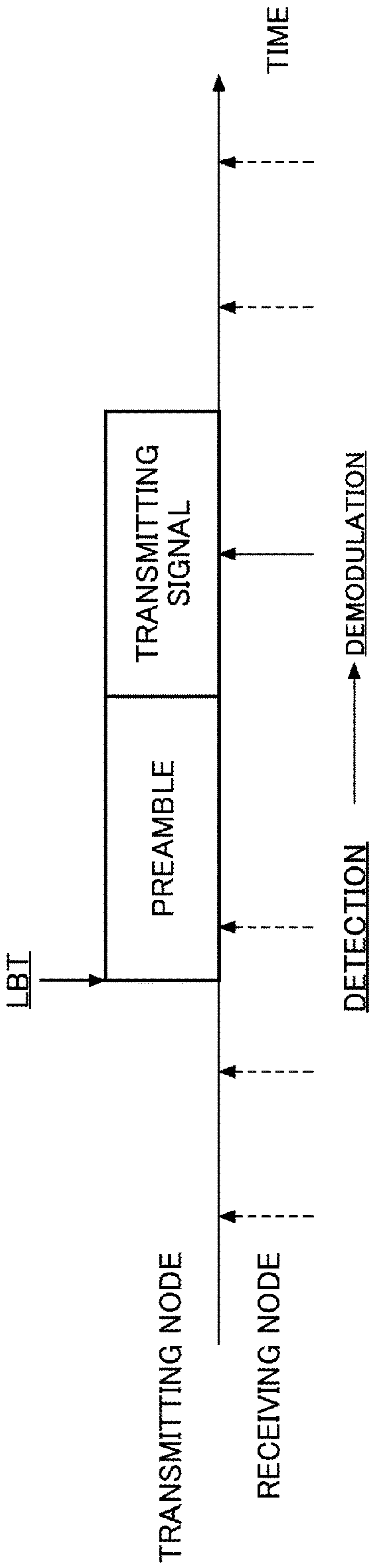
FIG. 7 is a diagram that illustrates an example (4) of transmission and reception according to an embodiment of the present invention.

FIG. 7 is a diagram that illustrates an example (4) of transmission and reception according to an embodiment of the present invention. Procedures pertaining to above control rule B2 will be described below with reference to FIG. 7. In above control rule B2, the following operations (1) to (4) may be executed.

(1) The transmitting node may transmit a transmitting signal by adding a preamble signal to the transmitting signal when LBT succeeds. For example, as illustrated in FIG. 7, LBT may be performed until shortly before the preamble signal is transmitted. The transmitting signal may include at least one of a data signal, a control signal, and a reference signal. The transmitting node may start LBT and transmission at any timing. When LBT is performed, the power may be detected in a predetermined time period immediately before the preamble signal is transmitted, and it may be determined that LBT succeeded if the receiving power there is less than or equal to a predetermined value. The predetermined value may be a threshold. When LBT fails, LBT may be performed again shortly before a given transmission timing. Alternatively, the timing for repeating LBT until LBT succeeds may be specified in the technical specifications, or may be configured or notified in advance from the receiving node. Note that, if the transmitting node performs LBT again and succeeds, the transmitting node may transmit the same transmitting signal as when LBT failed, or the transmitting node may transmit a different transmitting signal than when LBT failed.

(2) In the event the transmitting node transmits a number of signals continuously and the gap between the transmitting signals is less than or equal to a predetermined value, the transmitting node may not add a preamble signal except upon the first transmission. The predetermined value may be a threshold. In the event LBT succeeds when a number of signals are transmitted continuously and the gap between the transmitting signals is less than or equal to a predetermined value, the transmitting node may not perform LBT except upon the first transmission. The predetermined value may be a threshold. In the event LBT succeeds when a number of signals are transmitted continuously, the transmitting node may perform transmission without performing LBT for a predetermined period of time. When a plurality of transmitting signals are transmitted continuously, except for the first transmission, the timing for transmitting a signal may be determined based on the signal transmitted immediately before. For example, the next signal may start being transmitted X milliseconds after the end of the signal transmitted immediately before.

(3) The receiving node may detect the preamble signal. The receiving node may determine that a preamble is detected when the receiving power of the preamble signal is greater than or equal to a predetermined value.

(4) The receiving node may demodulate the transmitting signal upon detection of the preamble signal. The receiving node may specify the transmitting signal's resources based on the preamble signal detection result. The receiving node may specify the control signal's resources or detection opportunities (for example, a CORESET or search space) based on the detection result of the preamble signal, and perform blind detection for the control signal. Furthermore, the receiving node may demodulate the data signal upon detection of the control signal. The receiving node may specify the data and/or reference signal resources from the detection result of the control signal.

Feedback in above control rule A1, control rule A2, control rule B1, and control rule B2 needs to be considered. For example, assuming that channel state information (CSI) is subject to reporting, whether or not to use a trigger and the method of triggering; the definition of measurement signals, the method of making determinations and the method of reporting; the method of determining the content of a report; the procedures for transmitting the report; and so forth need to be considered.

It is therefore proposed here that a communication device that performs one of following 1) to 4) be introduced in a system in which the resources for transmitting data to a receiving communication device, that is, the base station 10 or the terminal 20, are autonomously determined by the transmitting communication device, that is, a system in which, for example, above control rule A1, control rule A2, control rule B1, or control rule B2 is employed:

1) Measuring predetermined information based on a signal received from a communication device, and transmitting information related to the measurement to that communication device;
2) Transmitting a signal to a communication device, and receiving a signal related to measurement based on the transmitted signal, from that communication device;
3) Transmitting a signal related to measurement of predetermined information, to a communication device, based on a signal received from that communication device; and
4) Transmitting a signal to a communication device, and receiving a signal related to measurement of predetermined information, in response to the transmitted signal, from that communication device.

The methods of above 1) and 2) may be referred to as "CSI measurement and reporting," and the signals used then may be referred to as "CSI-RS." Although the communication device that receives the measurement-related information may be the communication device that transmits data, this is by no means limiting, and a communication device that receives data may receive the measurement-related information as well.

The methods of above 3) and 4) may be referred to as "signal request for CSI," and the signals used then may be referred to as "sounding reference signal" (SRS). Although the communication device that receives the signal related to measurement of predetermined information may be the communication device that transmits data, this is by no means limiting, and a communication device that receives data may receive the signal related to measurement of predetermined information.

In a system in which the base station 10 or the terminal 20 autonomously selects the resources for DL, UL, or SL transmission, the above communication device can acquire information about channel states, which is necessary to determine, for example, the parameters for use in transmission. In other words, it is possible to select appropriate transmission parameters, and improve the spectral efficiency and the quality of transmission.

Note that, since the embodiment of the present invention can be applied to any of UL data, DL data, and SL data, hereinafter, the base station 10 and the terminal 20 will be each referred to as, for example, a "transmitting node," a "receiving node," a "communication device," and so forth.

Note that the terms "resource," "time period," and "window" may or may not include the LBT period.

The information to be measured and the information related to measurement may be any of following 1) to 3):

1) Channel States

Channel states may refer to information about, for example, the target frequency, the state of use of channels, the interference power value or level, other detectable communication devices, and the measurement values of propagation characteristics. Examples of such information include the channel quality indicator (CQI), the rank indicator (RI), the precoding matrix indicator (PMI), the layer indicator (LI), the reference signal received power (RSRP), the reference signal received quality (RSRQ), and the received signal strength indicator (RSSI). Furthermore, information about line of sight (LOS) and non-line of sight (NLOS) may be additional examples;

2) Information about the Location

The information about the location may be, for example, global navigation satellite system (GNSS) information, the latitude and longitude, the altitude, the area formation angle, information that identifies zones when a plane is divided into predetermined zones, the signal arrival angle, and so forth; and 3) Target of Measurement The target of measurement may be, for example, the type of signal, sequence, ID, resources, or the like, or may be information that indicates, based on which measurement target the CSI in question is, is measured.

Hereinafter, the above-mentioned information to be measured or the information related to measurement will be described as "CSI," but this is by no means limiting. A CSI report may include the above information to be measured or information related to measurement.

A node transmits a CSI request, and the node that receives this CSI request reports CSI to the node that transmitted the CSI request. The method of requesting CSI may be any of following 1) to 3):

1) A CSI request may be transmitted in a signal related to certain data transmission. The CSI request may be included in any of a data signal, a control signal, a reference signal, and a preamble signal. For example, a control signal may contain information corresponding to a CSI request. For example, a CSI request may be transmitted by using a reference signal sequence or a preamble signal sequence;

2) Transmission of a CSI request without data transmission may be defined. A control signal, a reference signal, or a preamble signal including a CSI request may be transmitted. A CSI request may be transmitted following the same transmission procedures as data transmission to which above control rule A1, A2, B1, or B2 is applied. In the event above control rule B1 or B2 is employed, LBT may be performed before a signal including a CSI request is transmitted; and 3) CSI reporting may be triggered if certain conditions are satisfied. For example, when data is transmitted from one node X to another node Y and a CSI request is received at the node Y while the data transmission is in progress, the node Y may trigger CSI reporting with the node X, and transmit a CSI report to the node X. For example, when data is transmitted from one node X to another node Y and yet there is no explicit CSI request, the node Y may trigger CSI reporting with the node X, and transmit a CSI report to the node X.

For example, if data is transmitted from one node X to another node Y and one of following conditions a), b), and c) is satisfied, the node Y may trigger CSI reporting with the node X, and transmit a CSI report to the node X:

a) Data reception or decoding fails a predetermined number of times or for a predetermined period of time;

b) The amount of resources in data transmission, the modulation and coding scheme (MCS), or the transport block size (TBS) exceeds or falls below a predetermined value; and c) Data transmission in predetermined time domain resources is reported in advance.

Figure 8:
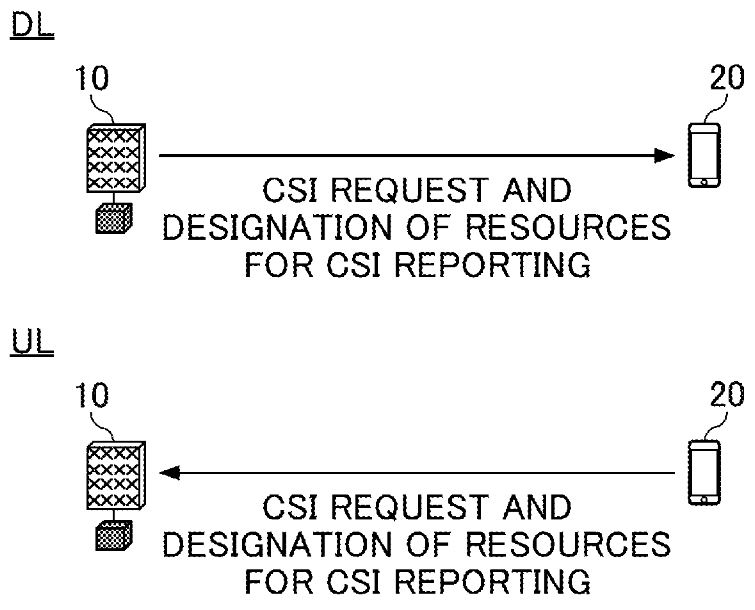
FIG. 8 is a diagram that illustrates an example (1) of CSI reporting resources according to an embodiment of the present invention.

FIG. 8 is a diagram that illustrates an example (1) of CSI reporting resources according to an embodiment of the present invention. As illustrated in FIG. 8, a node that requests CSI may designate CSI reporting resources for the CSI-reporting node. The resources may be designated in a predetermined unit of time (for example, in slots), or may be designated in a predetermined unit of time, frequency, or code (for example, in symbols, PRBs, cyclic shifts, orthogonal cover code (OCC) indices, etc.).

The CSI-requesting node may designate predetermined resources, that is, resources in at least one of the time, frequency, code, and space domains, as CSI reporting resources, based on a predetermined timing. This predetermined timing may be, for example, the synchronization timing and/or the timing the CSI request is transmitted in the event control rule A1 or B1 is employed, or the timing the CSI request is transmitted in the event control rule A2 or B2 is employed.

Information that indicates the CSI reporting resources may be shared with other nodes, or other nodes may simply use different resources. In addition, the information that indicates the CSI reporting resources may be shared only between terminals 20 that are associated with beams of the same base station 10, or information about the beams may be shared between these terminals 20. Information that indicates the CSI reporting resources by a single signal may be shared among multiple nodes.

The CSI-requesting node may designate predetermined resources based on the beam timing of the CSI-reporting node.

The CSI reporting resources may be designated by using any of a data signal, a control signal, a reference signal, and a preamble signal (when above control rule A2 or B2 is employed). The CSI reporting resources may also be designated by using any of a data signal, a control signal, a reference signal, and a preamble signal corresponding to the CSI report (when above control rule A2 or B2 is employed).

Figure 9:
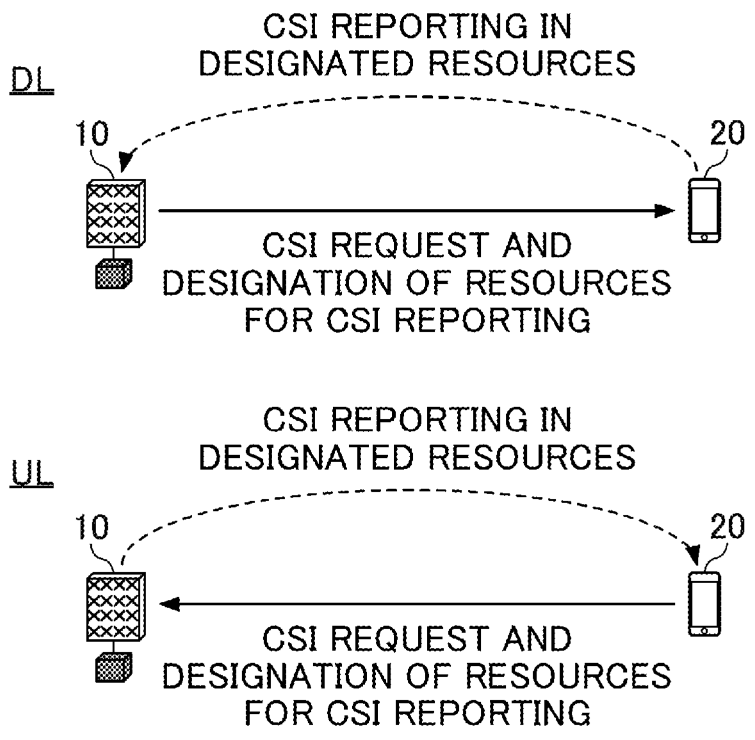
FIG. 9 is a diagram that illustrates an example (2) of CSI reporting resources according to an embodiment of the present invention.

FIG. 9 is a diagram that illustrates an example (2) of CSI reporting resources according to an embodiment of the present invention. As illustrated in FIG. 9, a node that reports CSI may transmit a CSI report to the CSI-requesting node by using resources designated by the CSI-requesting node. The CSI-reporting node may transmit a CSI report to the CSI-requesting node always by using resources designated by the CSI-requesting node.

Also, if the resources designated by the CSI-requesting node are not available for use, the CSI-reporting node may transmit a CSI report to the CSI-requesting node by using other resources. For example, when a different transmission or reception is planned in the same time domain resources as the resources designated by the CSI-requesting node, the CSI-reporting node may determine that the designated resources are not available for use. For example, assuming that above control rule A2 or B2 is employed, when a preamble signal is detected, related signals are decoded, and it becomes clear that at least part of the resources designated by the CSI-requesting node is used by other nodes, the CSI-reporting node may determine that the designated resources are not available for use. For example, assuming that above control rule A2 or B2 is employed, when a preamble signal is detected, related signals are decoded, and it is determined that the receiving operation is going to be performed in at least part of the resources designated by the CSI-requesting node, and, furthermore, reception and transmission cannot be performed concurrently, the CSI-reporting node may determine that the designated resources are not available for use. For example, if a signal from another CSI-requesting node is detected upon LBT, and transmission is not possible in the resources designated by the CSI-requesting node, the CSI-reporting node may determine that the designated resources are not available for use. Also, the CSI-reporting node may operate to transmit a CSI report up to a predetermined timing, and cancel the CSI report if the CSI-reporting node fails to transmit the CSI report by that predetermined timing.

Also, the CSI-reporting node need not use any resources and not report CSI if the designated resources are not available for use. The CSI-reporting node may autonomously determine the CSI reporting resources. For example, the CSI reporting resources may be any resources. That is, there may be no restrictions regarding the timing of CSI reporting.

Also, in the event above control rule A1, control rule A2, control rule B1, and control rule B2 are employed, the operation of determining transmission parameters such as the MCS index need to be considered.

The configuration, selection method, and reporting method of various transmission parameters will be described below.

Transmission parameters related to control signals or data signals may be determined by a transmitting node, and reported from the transmitting node to the receiving node by a predetermined method. The transmission parameters may include at least one of following 1) to 6):

1) Modulation and coding scheme (MCS);
2) Transmission power;
3) Information related to coding and data mapping (for example, the redundancy version (RV));
4) Information related to data signal resources (for example, parameters that are needed when deriving the time domain resource allocation (TDRA), the frequency domain resource allocation (FDRA), and the transport block size (TBS);
5) Spatial information (for example, antenna ports); and
6) Information related to control signal resources.

The method of reporting transmission parameters from the transmitting node to the receiving node may be any one of following 1) to 3):

1) Reporting via a control signal;
2) Reporting via a preamble; and
3) Reporting via a specific signal.

Also, the transmission parameters may be determined in advance, or may be determined based on information configured in a higher layer.

Transmission parameters related to control signals or data signals may be reported from the transmitting node to the receiving node by a predetermined method. As for the manner of this reporting, each transmission parameter may be separately reported to the receiving node. For example, each transmission parameter may be reported in a separate preamble or in a separate control signal. In addition, for example, transmission parameters may be collectively reported in the same control signal composed of multiple fields.

When multiple transmission parameters are reported, these transmission parameters may be managed by using a table, such as Table 1 below, in which every parameter set is composed of multiple transmission parameters combined.

TABLE 1

| Parameter set index | MCS | Transmission power |
|---|---|---|
| Index 1 | MCS index #1 | +x dB |
| Index 2 | MCS index #2 | −x dB |
| Index 3 | MCS index #3 | +y dB |

The index alone, which indicates which parameter set in the table is applied, may be reported to the terminal 20. In the example of Table 1, an MCS and transmission power that form a parameter set together are associated with one index. By using this table, the size of the preamble or control signal to use for reporting is reduced. Note that this table may accommodate transmission parameter sets for the signals that are transmitted from the transmitting node, or the transmitting node may use this table to indicate which transmission parameter set the receiving node should use, to the receiving node.

As for the method of determining the combinations of multiple transmission parameters, for example, a method in which another node determines the combinations and reports these combinations to the transmitting node may be used, or such combinations may be defined in the technical specifications, or combinations to be applied to a predetermined number of nodes may be configured in advance.

As for the method of determining which table is applied when multiple tables are configured, for example, a method in which the determination is made based on a higher layer configuration, a method in which the determination is made based on a report in a preamble, a control signal, or a dedicated signal, or methods defined in the technical specifications may be used as appropriate depending on the type of traffic may be used.

The configuration of MCS will be described below. Table 2 is an example of an MCS index table.

TABLE 2

| MCS index | Modulation and coding scheme | Coding rate |
|---|---|---|
| Index 1 | BPSK | 0.117 |
| Index 2 | QPSK | 0.332 |
| Index 3 | QPSK | 0.540 |

As shown in Table 2, the MCS index may indicate at least the modulation scheme and the coding rate. It is also possible to define an MCS index table, in which one MCS index corresponds to multiple combinations of modulation schemes and coding rates. Furthermore, multiple candidate MCS index tables can be configured, in which modulation schemes and coding rates are combined differently. Which MCS index table is used may be determined according to one of a higher layer parameter, a control signal, a preamble, a dedicated signal, and a radio network temporary identifier (RNTI) (which may be one that is scrambled with a cyclic redundancy check (CRC), or one that is applied to a control signal or a dedicated signal).

The selection of MCS will be described below. The transmitting node may select an MCS index by at least one of following methods 1) to 5):

Method 1) The Terminal 20 selects the MCS for the data signal to be transmitted at present, based on channel information that is reported from another node based on a previously transmitted reference signal. This reference signal may be a signal referred to as “CSI-RS” or “SRS,” or may be a preamble or a control signal;

Method 2) The terminal 20 selects the MCS for a data signal based on feedback information received from another node. This feedback information may be HARQ-ACK information, which indicates success or failure of reception or decoding of transmitted data. For example, if the HARQ-ACK in response to the previously transmitted data is a NACK, an MCS index with a lower coding rate may be selected. This feedback information may be the receiving power of the feedback signal. For example, if this receiving power is smaller than a predetermined value, an MCS index with a lower coding rate may be selected;

Method 3) The terminal 20 selects the MCS index reported from another node. This another node may measure channel information based on a reference signal received from the transmitting node, and report an MCS index, to the transmitting node, based on the measurement. The transmitting node may or may not apply the MCS index received from the node to the transmission at a predetermined timing;

Method 4) The terminal 20 selects the MCS index determined by decrementing or incrementing the MCS index of the previous transmission; and Method 5) The terminal 20 selects the MCS index configured by a higher layer parameter.

Furthermore, the terminal 20 may employ above method 5) and apply a default MCS index to the initial transmission or the like, and employ above method 1) after a channel information report is received.

Furthermore, in above method 1), method 2), and method 3), if a predetermined period of time elapses since information is received from another node, the terminal 20 may uses the default MCS index in accordance with above method 5). That is, fallback operation may be performed.

Furthermore, the terminal 20 may employ different MCS index selection methods based on connection information. The connection information may be RRC connection states. For example, the method of MCS index selection may be changed depending on whether RRC connection is established or not. In the event RRC connection is established, the default MCS can be configured, and may be applied to the initial transmission. Then, for example, after a channel information report is received, above method 1) may be employed, and fallback to the default MCS may be made depending on conditions. In the event no RRC connection is established, the default MCS defined in the technical specifications may be applied to the initial transmission, and another MCS index may be reported by receiving control signals.

Furthermore, the terminal 20 may employ any of above methods 1) to 5) based on the type of traffic.

Note that MCS selection may be linked and controlled with transmission power control. For example, when the MCS and transmission power are controlled based on the receiving power of signals, one or both of them may be controlled. For example, when a signal’s receiving power is lower than a predetermined value, the terminal 20 may select an MCS with a lower coding rate and/or increase the transmission power.

Figure 10:
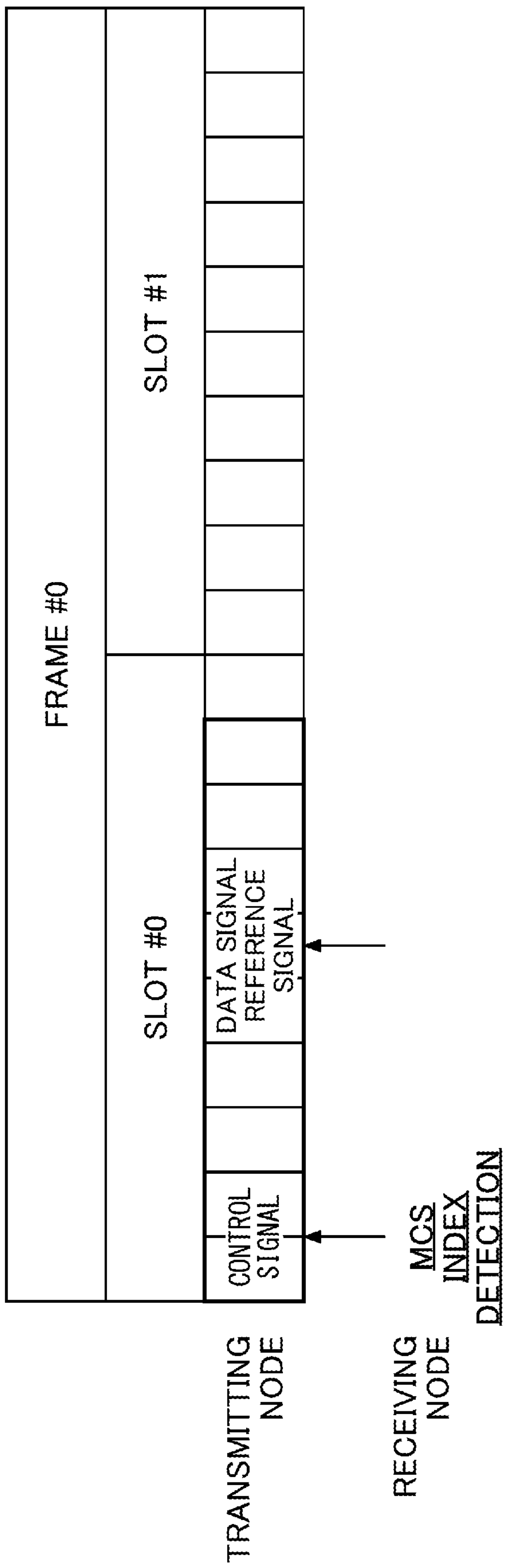
FIG. 10 is a diagram that illustrates an example (1) of MCS index reporting according to an embodiment of the present invention.

Now, the method of reporting MCS for data signals to the receiving terminal will be described below. FIG. 10 is a diagram that illustrates an example (1) of MCS index reporting according to an embodiment of the present invention. As illustrated in FIG. 10, a data signal’s MCS index may be reported to the receiving terminal based on a control signal.

Figure 11:
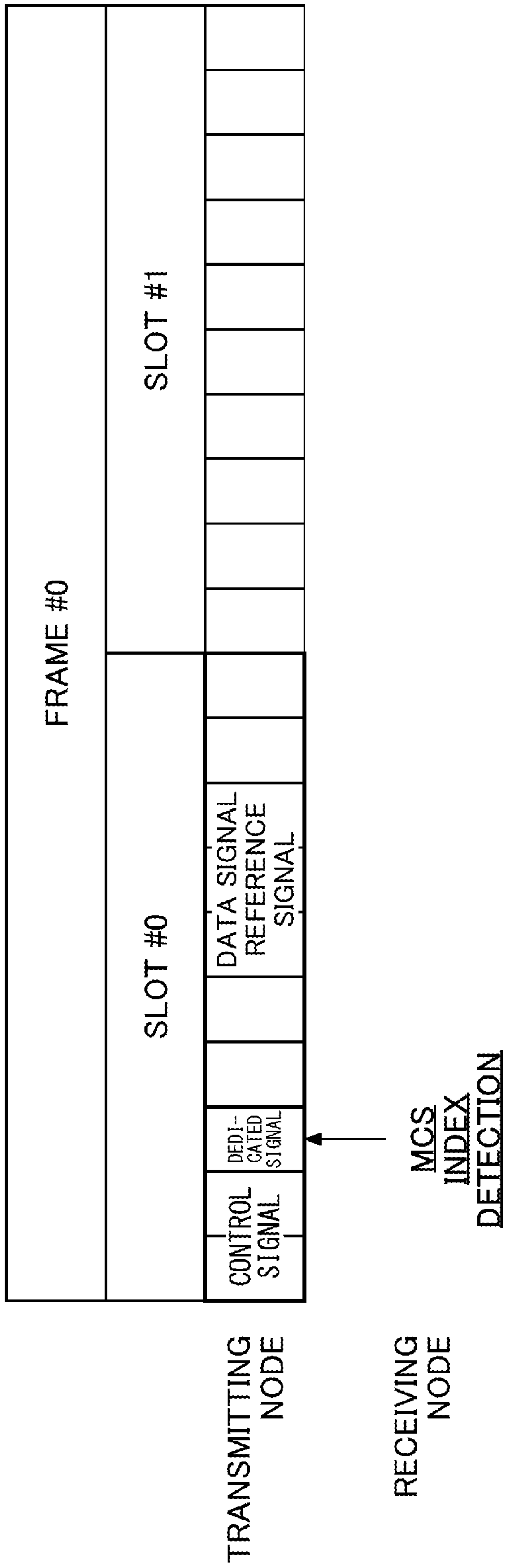
FIG. 11 is a diagram that illustrates an example (2) of MCS index reporting according to an embodiment of the present invention.

FIG. 11 is a diagram that illustrates an example (2) of MCS index reporting according to an embodiment of the present invention. As illustrated in FIG. 11, the MCS index may be reported to the receiving terminal in a dedicated signal other than a control signal and a data signal. The dedicated signal may be a signal for reporting MCS or a signal for reporting transmission parameters.

Figure 12:
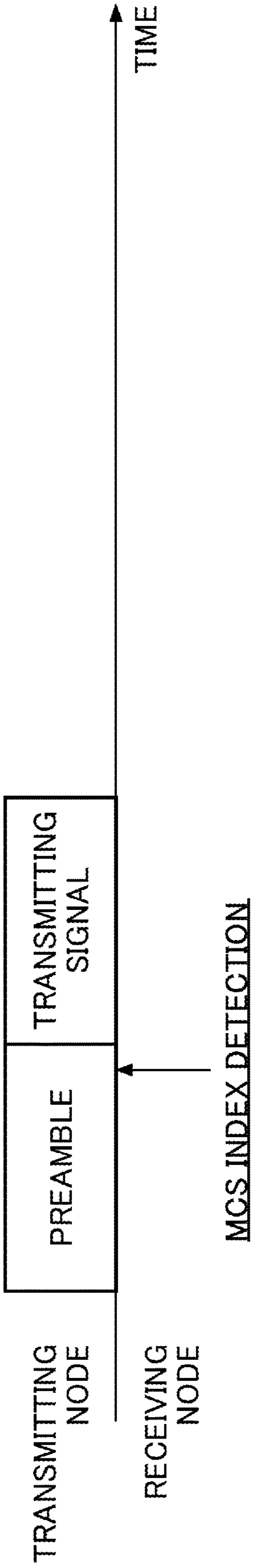
FIG. 12 is a diagram that illustrates an example (3) of MCS index reporting according to an embodiment of the present invention.

FIG. 12 is a diagram that illustrates an example (3) of MCS index reporting according to an embodiment of the present invention. As illustrated in FIG. 12, a data signal’s MCS index may be reported to the receiving terminal in a preamble. Also, a data signal’s MCS index may be reported to the receiving terminal in a control signal as well.

Figure 13:
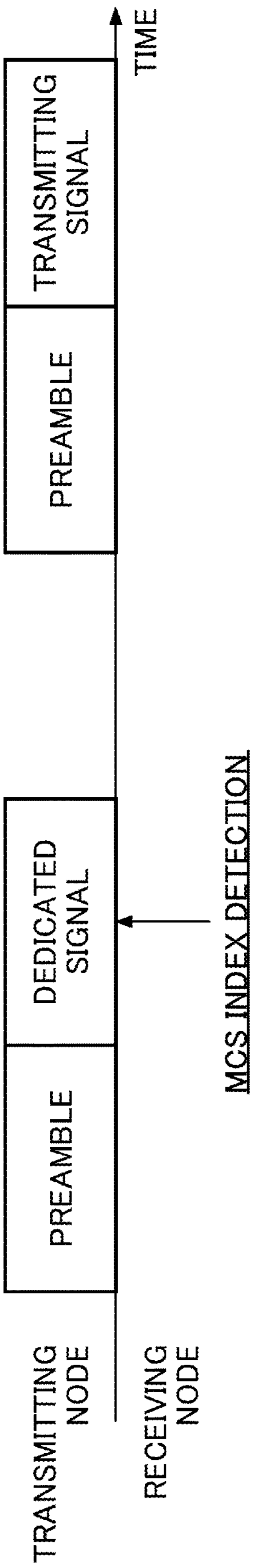
FIG. 13 is a diagram that illustrates an example (4) of MCS index reporting according to an embodiment of the present invention.

FIG. 13 is a diagram that illustrates an example (4) of MCS index reporting according to an embodiment of the present invention. As illustrated in FIG. 13, the MCS index may be reported to the receiving terminal in a dedicated signal. Meantime, it is also possible to transmit signals discontinuously, such as transmitting a preamble followed by a dedicated signal, transmitting a preamble followed by a transmitting signal, and so on.

Figure 14:
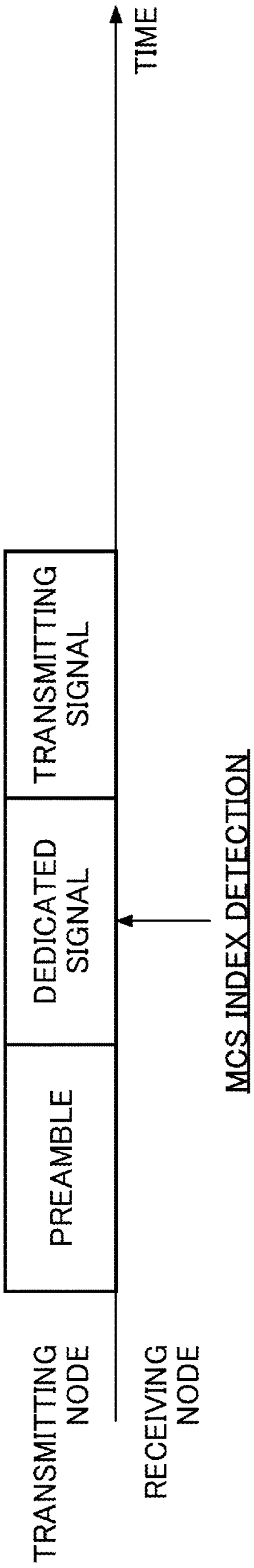
FIG. 14 is a diagram that illustrates an example (5) of MCS index reporting according to an embodiment of the present invention.

FIG. 14 is a diagram that illustrates an example (5) of MCS index reporting according to an embodiment of the present invention. As illustrated in FIG. 14, the MCS index may be reported to the receiving terminal in a dedicated signal. Meantime, it is also possible to transmit signals continuously in order, such as transmitting a preamble followed by a dedicated signal, transmitting a transmitting signal following the dedicated signal, and so on.

Also, a data signal's MCS index may be reported to the receiving terminal by a higher layer.

Transmission power control will be described below. Transmission power control may be applied to at least one of a data signal, a control signal, a reference signal, an initial access signal, and a feedback signal. As for the manner of transmission power control, transmission power may be controlled according to at least one of following methods 1) to 3).

Method 1) Transmission power may be determined based on information received from another node (open loop).cv The information that is received in order to determine transmission power may be path loss. Path loss may be estimated based at least on a reference signal. The reference signal may be a synchronization signal (for example, SSB) or a signal for measuring CSI (for example, CSI-RS). The periodicity of this signal, the content of resource reporting, or the method of reporting may be the same as in CSI reporting described above, or different methods may be used.

Also, the information that is received in order to determine transmission power may be an acknowledgment. The acknowledgment may be acknowledgment information (for example, HARQ-ACK) in response to the most recently transmitted data. For example, when the acknowledgment information indicates a NACK, the terminal 20 may increase the transmission power by a predetermined value. The predetermined value may be defined in advance, may be configured in a higher layer, or may be reported in a control signal or a preamble. The method and resources for reporting the acknowledgment may be reported from the transmitting node to the receiving node, or may be determined by the receiving node, or other methods may be used as well. Note that transmission power may be determined based on signals or acknowledgment information received within a predetermined period of time. The predetermined period of time may be defined in the technical specifications, may be configured in a higher layer, or may be reported in a preamble, a control signal, or the like.

Method 2) Transmission power may be determined based on transmission power indicated by another node (closed loop).

The transmitting node may indicate transmission power to the receiving node. Table 3 is an example of designating the relative values of correction values for transmission power.

TABLE 3

| Index | Relative value |
|---|---|
| Index 1 | −1 |
| Index 2 | 1 |
| Index 3 | 3 |

Correction values that can be indicated may be defined in the example of Table 3, and which correction value should be used may be reported by using an index. For example, the correction values may include −1 dB, 1 dB, and 3 dB, and other values may be used as well.

Table 4 is an example of designating the absolute values of correction values for transmission power.

TABLE 4

| Index | Absolute value |
|---|---|
| Index 1 | 17 |
| Index 2 | 20 |
| Index 3 | 23 |

Absolute values that can be indicated may be defined in the example of Table 4, and which correction value should be used may be reported by using an index. For example, the correction values may include 17 dBm, 20 dBm, and 23 dBm, and other values may be used as well.

Table 5 is an example of designating the relative and absolute values of correction values for transmission power.

TABLE 5

| Index | Relative value | Absolute value |
|---|---|---|
| Index 1 | −1 | 17 |
| Index 2 | 1 | 20 |
| Index 3 | 3 | 23 |

As shown in Table 5, both relative and absolute values may be reported.

As for the power values, which power value is subject to control may be determined based on the desired signal-to-interference power ratio (SIR) and the SIR measured at the transmitting node.

Figure 15:
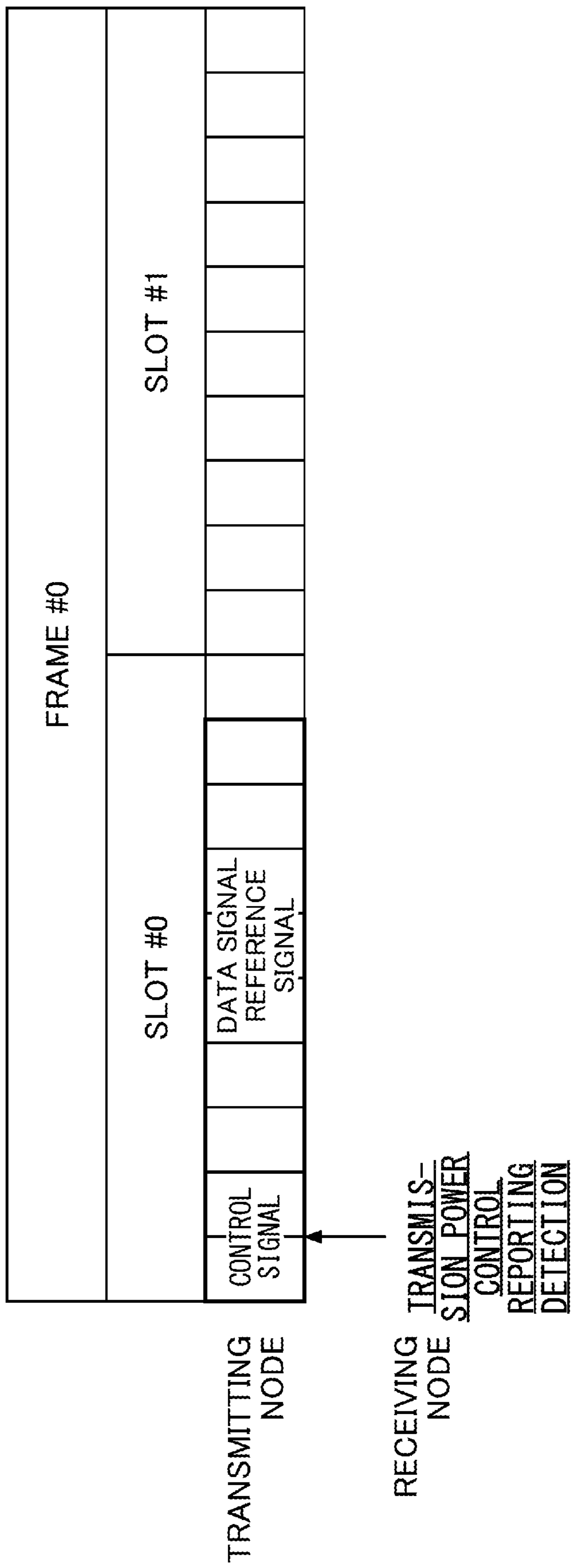
FIG. 15 is a diagram that illustrates an example (1) of transmission power control reporting according to an embodiment of the present invention.

FIG. 15 is a diagram that illustrates an example (1) of transmission power control reporting according to an embodiment of the present invention. As illustrated in FIG. 15, a control signal may report the index of a correction value for a data signal's transmission power, to the receiving terminal.

Figure 16:
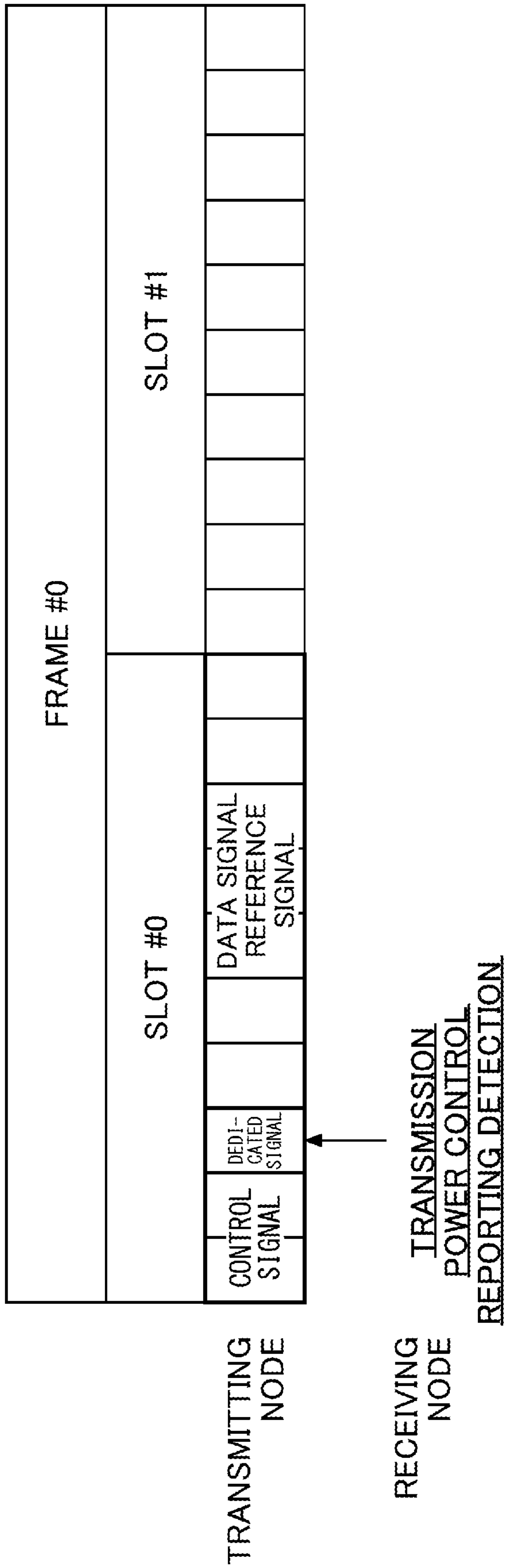
FIG. 16 is a diagram that illustrates an example (2) of transmission power control reporting according to an embodiment of the present invention.

FIG. 16 is a diagram that illustrates an example (2) of transmission power control reporting according to an embodiment of the present invention. As illustrated in FIG. 16, the index of a correction value for a data signal's transmission power may be reported to the receiving terminal in a dedicated signal other than a control signal or a data signal. The dedicated signal may be a signal for reporting transmission power, or may be a signal for reporting transmission parameters. The location of the dedicated signal's resources may be reported to the receiving node in a control signal, or may be determined in advance. For example, the symbol next to the last symbol of a control signal may be used, or an offset may be applied to the last symbol of the control signal.

Figure 17:
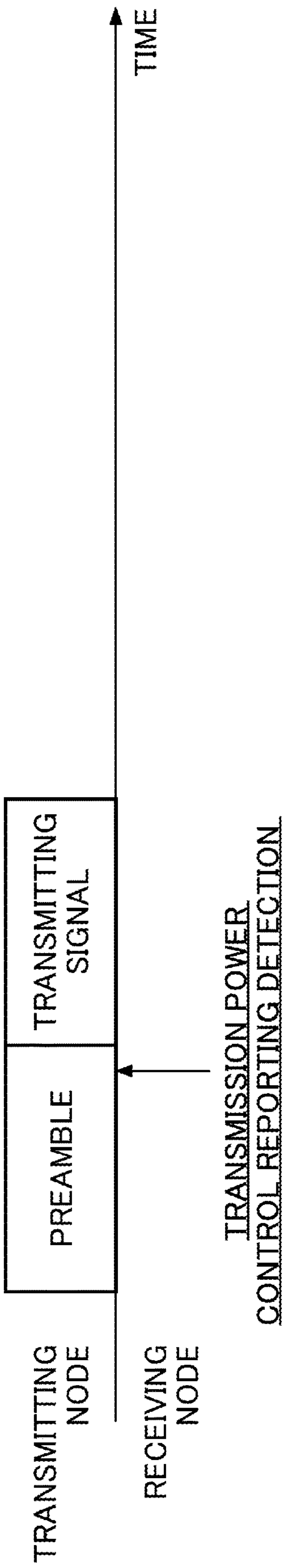
FIG. 17 is a diagram that illustrates an example (3) of transmission power control reporting according to an embodiment of the present invention.

FIG. 17 is a diagram that illustrates an example (3) of transmission power control reporting according to an embodiment of the present invention. As illustrated in FIG. 17, the index of a correction value for a data signal's transmission power may be reported to the receiving terminal in a preamble. Also, the index of a correction value for a data signal's transmission power may be reported to the receiving terminal in a control signal.

Figure 18:
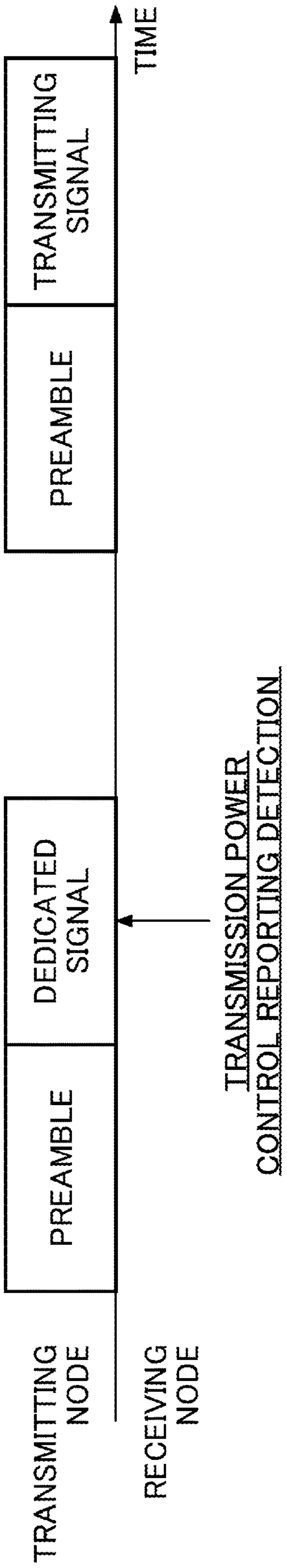
FIG. 18 is a diagram that illustrates an example (4) of transmission power control reporting according to an embodiment of the present invention.

FIG. 18 is a diagram that illustrates an example (4) of transmission power control reporting according to an embodiment of the present invention. As illustrated in FIG. 18, the index of a correction value for a data signal's transmission power may be reported to the receiving terminal in a dedicated signal. Meantime, it is also possible to transmit signals discontinuously, such as transmitting a preamble followed by a dedicated signal, transmitting a preamble followed by a transmitting signal, and so on.

Figure 19:
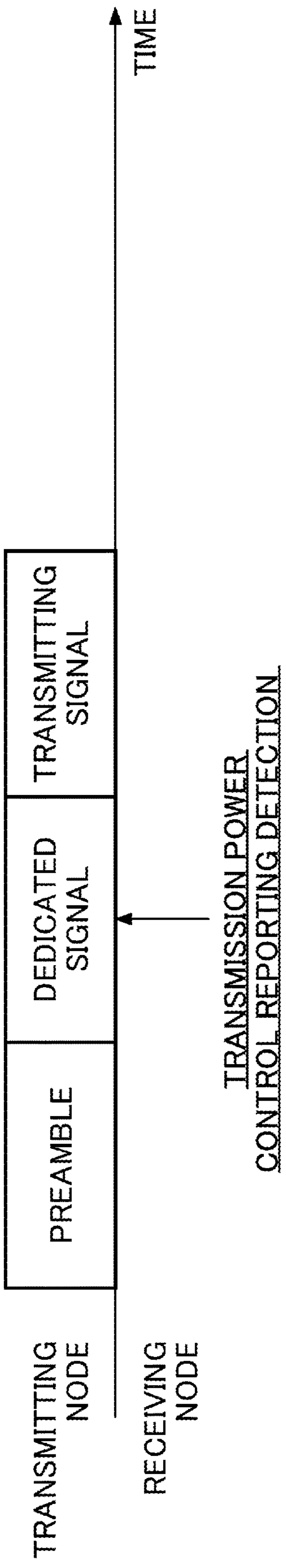
FIG. 19 is a diagram that illustrates an example (5) of transmission power control reporting according to an embodiment of the present invention.

FIG. 19 is a diagram that illustrates an example (5) of transmission power control reporting according to an embodiment of the present invention. As illustrated in FIG. 19, the index of a correction value for a data signal's transmission power may be reported to the receiving terminal in a dedicated signal. Meantime, it is also possible to transmit signals continuously in order, such as transmitting a preamble followed by a dedicated signal, transmitting a transmitting signal following the dedicated signal, and so on.

Method 3) A predetermined value may be added to the transmission power (that is, power ramping) until a response to successful signal transmission (for example, a data signal) is received from the receiving node. In other words, for each unsuccessful signal transmission, the transmitting node may perform signal transmission with transmission power increased by a predetermined value.

The predetermined value may be defined in advance, may be configured in a higher layer, or may be reported in a preamble or a control signal.

In transmission power control, the maximum transmission power may be defined for each node. Transmission power may be determined based on the maximum transmission power. For example, transmission power may be controlled so as not to exceed the maximum transmission power. Also, transmission power may be controlled on a per beam basis. For example, a transmission power control report may be transmitted for each beam so as to control each beam's power. Also, transmission power may be determined based on the target receiving level of the signal that is targeted for transmission power control. Also, transmission power may be linked and controlled with MCS determination. For example, when selecting the MCS or controlling transmission power based on the receiving power of a signal, the terminal 20 may control only one or both of these. For example, when a signal's receiving power is lower than a predetermined value, the terminal 20 may select an MCS with a lower coding rate and/or increase the transmission power. Also, transmission power may be controlled differently depending on each signal's priority. Also, transmission power may be controlled differently depending on the maximum and latest power capability of the transmitting node. For example, transmission power may be controlled according to the power class (PC2: maximum 26 dBm, PC3: maximum 23 dBm, etc.).

Figure 20:
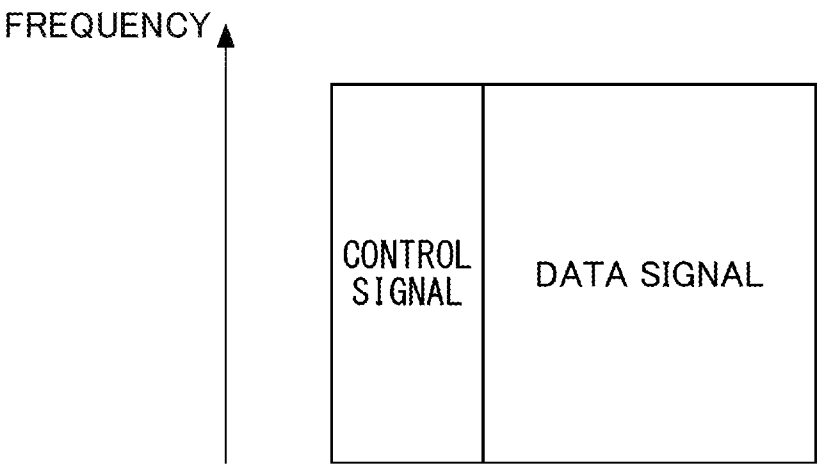
FIG. 20 is a diagram that illustrates an example (1) of frequency domain resources according to an embodiment of the present invention.
Figure 21:
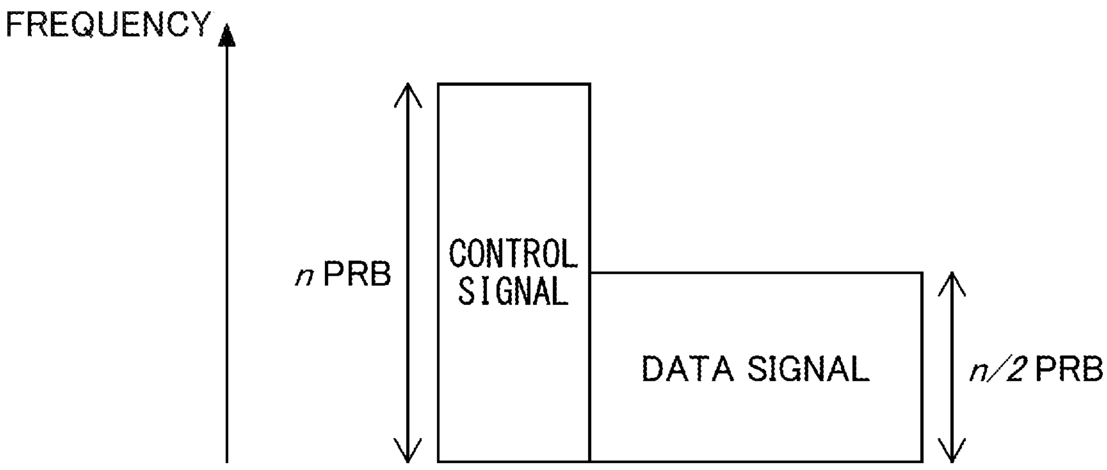
FIG. 21 is a diagram that illustrates an example (2) of frequency domain resources according to an embodiment of the present invention.

Information related to data signal resources will be described below. Frequency domain resources may be designated by any of following methods 1) to 4):

Method 1) The starting point and the length of frequency domain resources may be designated in a predetermined unit of measurement. This predetermined unit of measurement may be RE, RB, RB set (i.e. combination of multiple RBs), BWP, or CC;

Method 2) Resource allocation information may be reported per first predetermined unit of measurement, in a second predetermined unit of measurement. For example, the allocation information may be reported in bitmaps, per BWP allocated to the node, that is, per first unit of measurement, in units of 2 RBs, that is, in a second unit of measurement. Also, the allocation information may be reported in bitmaps, per BWP allocated to the node, that is, per first unit of measurement, in units of half BWPs, that is, in a second unit of measurement;

Method 3) A report to indicate that the frequency domain resources of a data signal are the same as those of a preamble or a control signal may be reported. FIG. 20 is a diagram that illustrates an example (1) of frequency domain resources according to an embodiment of the present invention. As illustrated in FIG. 20, a report to indicate that the frequency domain resources of a data signal are the same as those of a preamble or a control signal may be reported; and Method 4) Unique resources may be determined for data based on resources of a received control signal/preamble signal. FIG. 21 is a diagram that illustrates an example (2) of frequency domain resources according to an embodiment of the present invention. For example, as illustrated in FIG. 21, half the frequency domain resources of a control signal or a preamble signal may be allocated to a data signal.

Above method 1) and method 2) may be switched by a higher layer, a preamble, or a control signal. Also, which BWP or CC is used to transmit a data signal may be reported apart from the allocation information.

The starting point or the length of time domain resources may be indicated by using a predetermined unit of measurement. This predetermined unit of measurement may be the nanosecond, microsecond, millisecond, second, symbol, or slot. As for the starting point, the last symbol of a control signal may be designated the starting point, or the control signal's first or last symbol with an offset may be designated the starting point, or any symbol or slot may be used. Also, the end of a preamble may be designated the starting point, or the preamble's beginning or end with an offset may be designated the starting point. The offset may be defined in advance, may be configured by a higher layer, or may be reported in a preamble or a control signal.

The allocation of frequency domain or time domain resources may be linked and controlled with MCS determination and transmission power control. For example, when the resource allocation, MCS selection, and transmission power upon a retransmission are controlled based on the signal's receiving power, only one of these may be controlled, or all of these may be controlled. If the signal's receiving power is lower than a predetermined value, a different amount of resources and/or resources from different locations may be allocated, an MCS with a lower coding rate may be selected, or the transmission power may be increased.

The amount of information that a data signal carries may be referred to as "TBS." The TBS may be defined by the burst period, the frequency domain resources, the number of layers, the MCS index, or the overhead. As for the parameter to use when deriving the amount of information that a data signal carries, it is possible to use overhead, or use a parameter that indicates initial transmission or retransmission. This overhead may be determined by counting the resources used for a reference signal and a control signal as overhead, in a predetermined unit of measurement. This predetermined unit of measurement may be RE or RB. The parameter to indicate initial transmission or retransmission may be a new data indicator (NDI).

Figure 22:
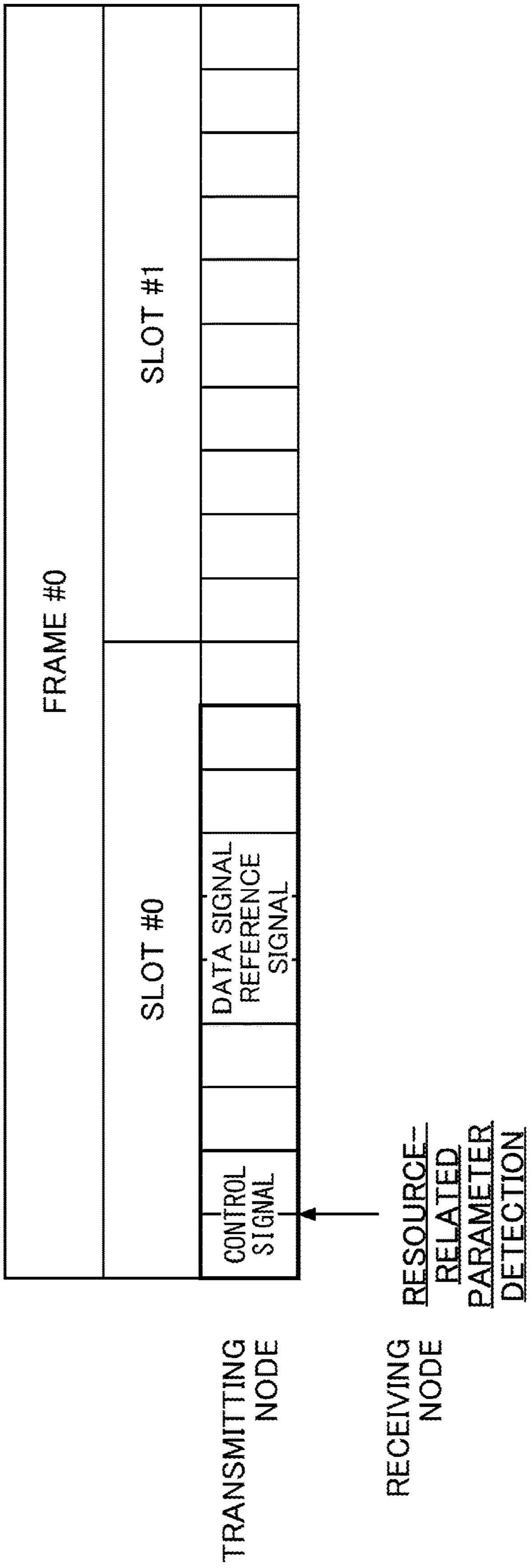
FIG. 22 is a diagram that illustrates an example (1) of resource-related parameter reporting according to an embodiment of the present invention.

FIG. 22 is a diagram that illustrates an example (1) of resource-related parameter reporting according to an embodiment of the present invention. As illustrated in FIG. 22, parameters related to a data signal's resources may be reported to the receiving terminal in a control signal.

Figure 23:
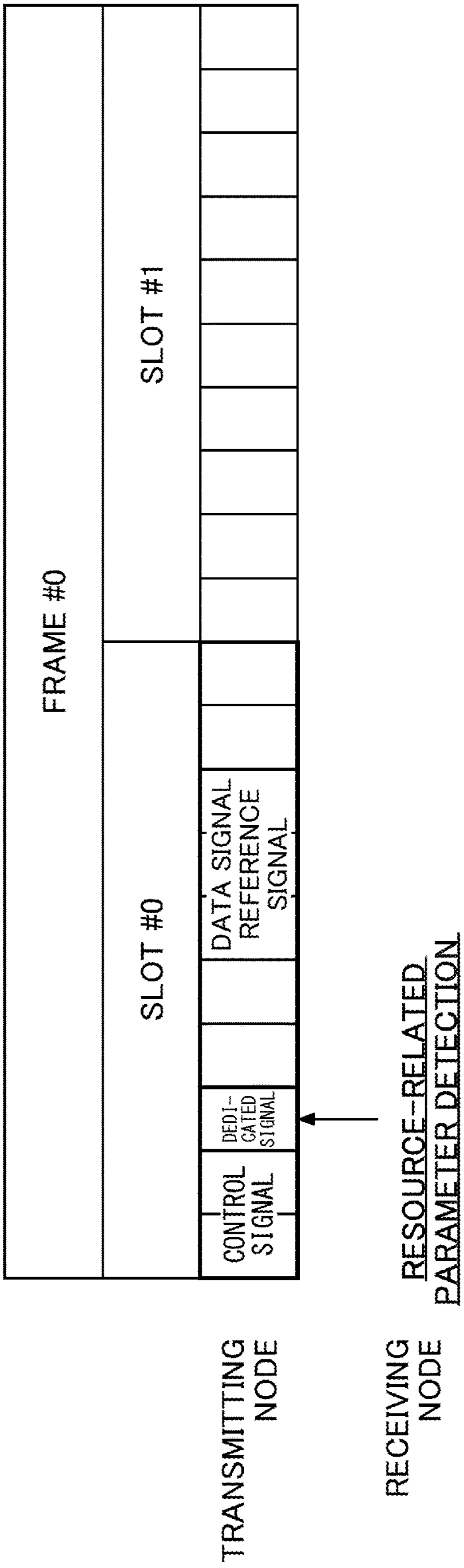
FIG. 23 is a diagram that illustrates an example (2) of resource-related parameter reporting according to an embodiment of the present invention.

FIG. 23 is a diagram that illustrates an example (2) of resource-related parameter reporting according to an embodiment of the present invention. As illustrated in FIG. 23, parameters related to a data signal's resources may be reported to the receiving terminal in a dedicated signal other than a control signal or the data signal. The dedicated signal may be a signal for reporting resource-related parameters or a signal for reporting transmission parameters. The location of the dedicated signal's resources may be reported to the receiving node in a control signal, or may be determined in advance. For example, the symbol next to the last symbol of a control signal may be used, or an offset may be applied to the last symbol of the control signal.

Figure 24:
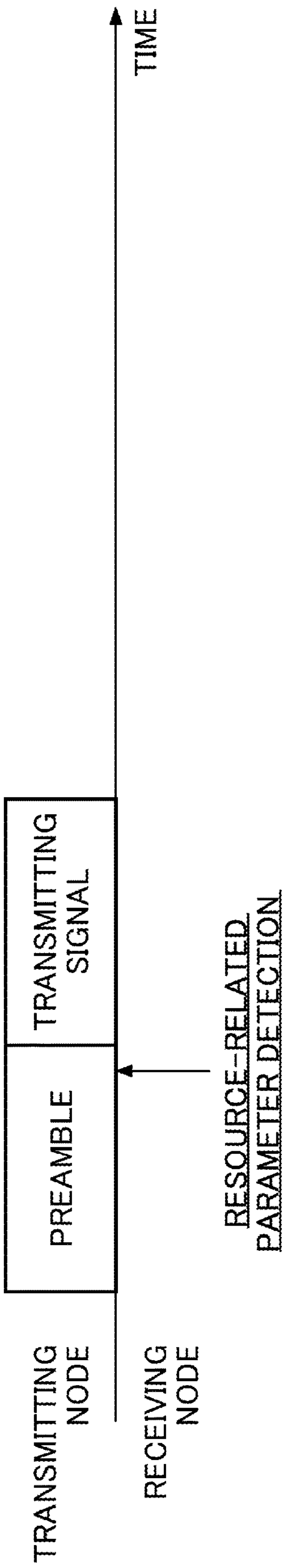
FIG. 24 is a diagram that illustrates an example (3) of resource-related parameter reporting according to an embodiment of the present invention.

FIG. 24 is a diagram that illustrates an example (3) of resource-related parameter reporting according to an embodiment of the present invention. As illustrated in FIG. 24, parameters related to a data signal's resources may be reported to the receiving terminal in a preamble. Also, parameters related to a data signal's resources may be reported to the receiving terminal in a control signal.

Figure 25:
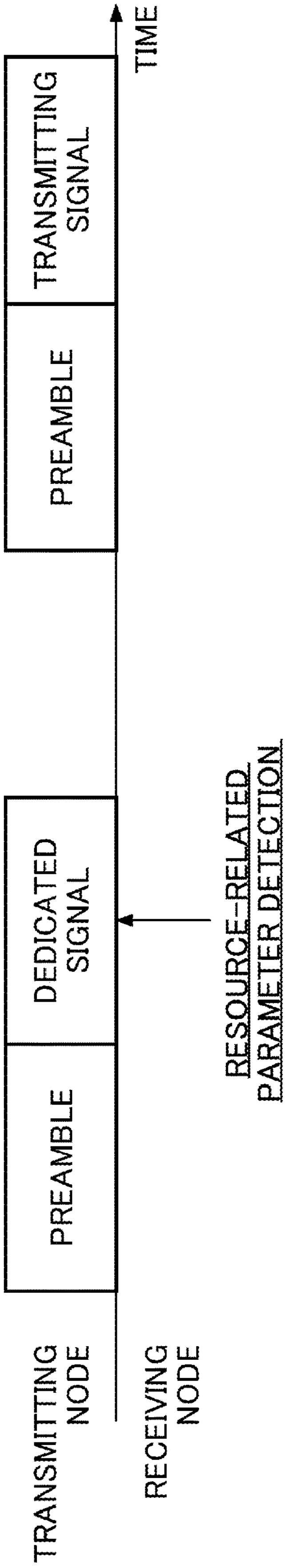
FIG. 25 is a diagram that illustrates an example (4) of resource-related parameter reporting according to an embodiment of the present invention.

FIG. 25 is a diagram that illustrates an example (4) of resource-related parameter reporting according to an embodiment of the present invention. As illustrated in FIG. 25, parameters related to a data signal's resources may be reported to the receiving terminal in a dedicated signal. Meantime, it is also possible to transmit signals discontinuously, such as transmitting a preamble followed by a dedicated signal, transmitting a preamble followed by a transmitting signal, and so on.

Figure 26:
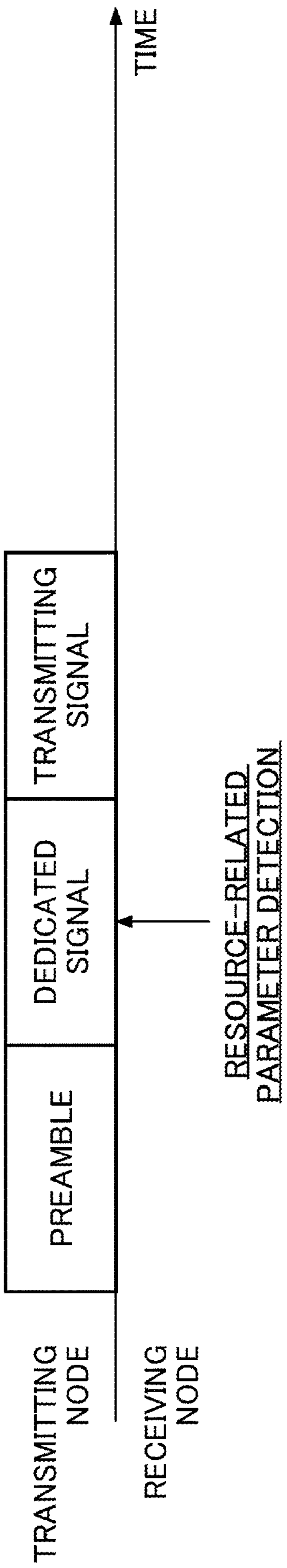
FIG. 26 is a diagram that illustrates an example (5) of resource-related parameter reporting according to an embodiment of the present invention.

FIG. 26 is a diagram that illustrates an example (5) of resource-related parameter reporting according to an embodiment of the present invention. As illustrated in FIG. 26, parameters related to a data signal's resources may be reported to the receiving terminal in a dedicated signal. Meantime, it is also possible to transmit signals continuously in order, such as transmitting a preamble followed by a dedicated signal, transmitting a transmitting signal following the dedicated signal, and so on.

Information related to coding and data mapping will be described below. In the structure of information after coding, which bits are transmitted may be reported. The systematic bits and parity bits may be configured in queues, circular buffers, or the like. For example, the 0th, 1st, 2nd, 3rd, 4th, 5th, 6th, 7th, and 8th bits may be transmitted in the initial transmission, and the 2nd, 4th, 6th, and 8th bits may be transmitted in a retransmission.

Figure 27:
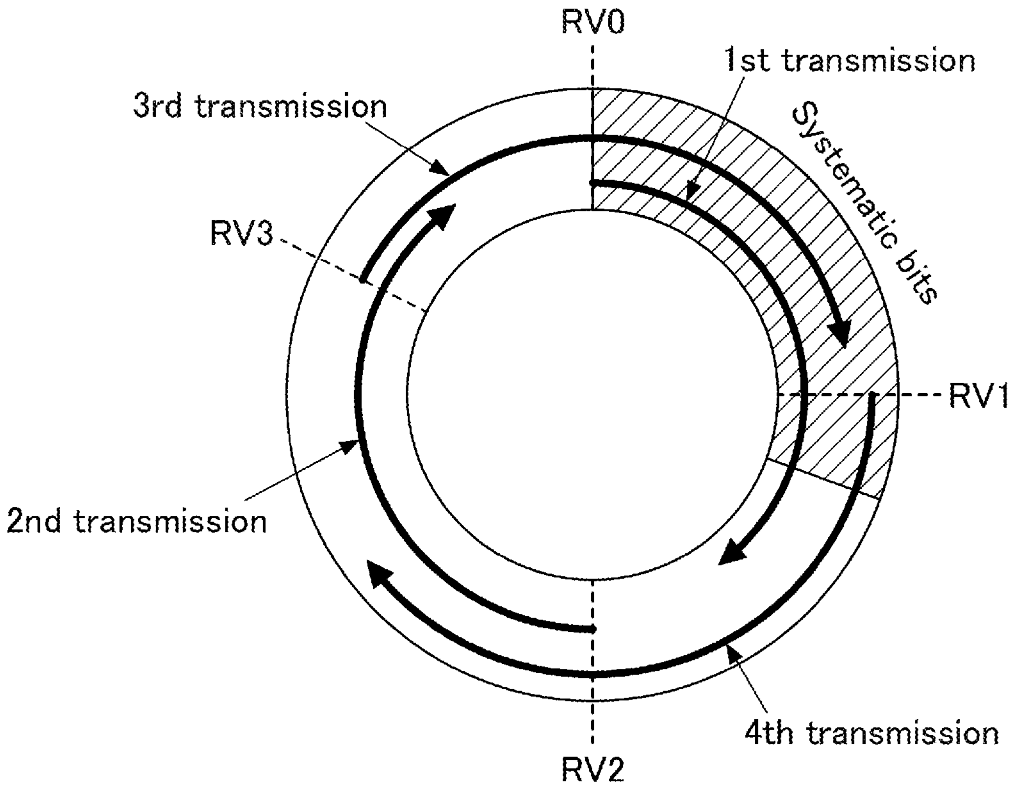
FIG. 27 is a diagram that illustrates examples of RVs according to an embodiment of the present invention.

FIG. 27 is a diagram that illustrates examples of RVs according to an embodiment of the present invention. As illustrated in FIG. 27, each bit where transmission is started and the length of each transmission may be defined in a predetermined unit of measurement (for example, in RVs). Multiple RVs may be configured, and each RV may have a different starting point. The coded bits to be transmitted may be designated by a method other than the ones described above.

Among the coded bits, the coded bits that are to be transmitted may be directly reported as the reporting content of the coded bits to be transmitted. For example, in the event the above method of reporting which bits are transmitted is employed, the bits to be transmitted in the bit sequence may be represented as "1," and the bits not to be transmitted may be represented as "0." Also, the above RVs may be reported.

Also, an index that indicates which coded bits are going to be transmitted may be reported. Table 6 shows examples such indices to be reported.

TABLE 6

| | $rv_{id}$ to be applied to $n^{th}$ transmission occasion | | | |
|---|---|---|---|---|
| Index ($rv_{id}$) | n mod 4 = 0 | n mod 4 = 1 | n mod 4 = 2 | n mod 4 = 3 |
| 0 | 0 | 2 | 3 | 1 |
| 2 | 2 | 3 | 1 | 0 |

TABLE 6-continued

| | $rv_{id}$ to be applied to $n^{th}$ transmission occasion | | | |
|---|---|---|---|---|
| Index ($rv_{id}$) | n mod 4 = 0 | n mod 4 = 1 | n mod 4 = 2 | n mod 4 = 3 |
| 3 | 3 | 1 | 0 | 2 |
| 1 | 1 | 0 | 2 | 3 |

For example, as shown in Table 6, an index that indicates which RV is applied to the n-th transmission may be reported. That is, the RV may be determined based on the index value reported, and the number of times of transmission.

Figure 28:
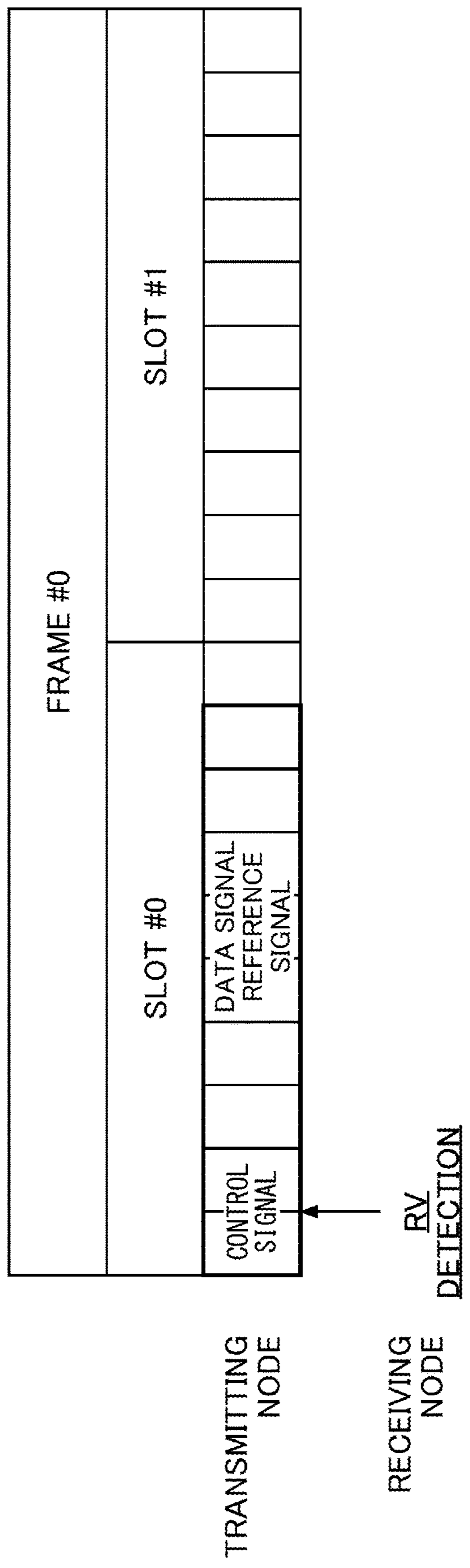
FIG. 28 is a diagram that illustrates an example (1) of coding-related parameter reporting according to an embodiment of the present invention.

FIG. 28 is a diagram that illustrates an example (1) of coding-related parameter reporting according to an embodiment of the present invention. As illustrated in FIG. 28, parameters related to coding of a data signal may be reported to the receiving terminal in a control signal. Note that the RV detection illustrated in FIG. 28 is an example, and other coding-related parameters may be detected as well.

Figure 29:
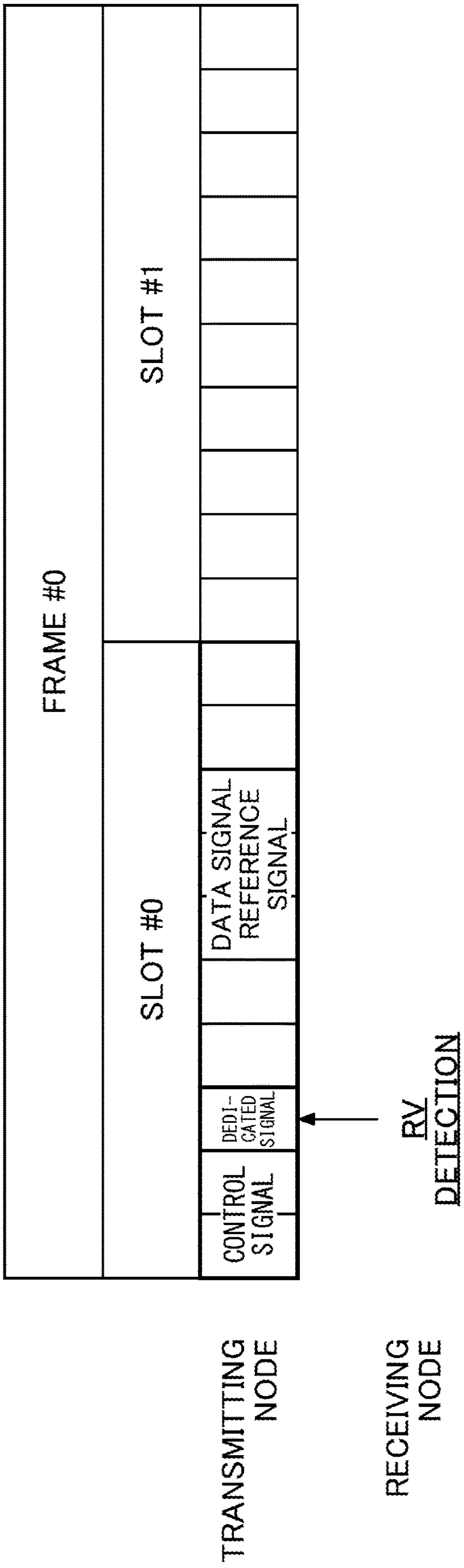
FIG. 29 is a diagram that illustrates an example (2) of coding-related parameter reporting according to an embodiment of the present invention.

FIG. 29 is a diagram that illustrates an example (2) of coding-related parameter reporting according to an embodiment of the present invention. As illustrated in FIG. 29, parameters related to coding of a data signal may be reported to the receiving terminal in a dedicated signal other than a control signal or the data signal. The dedicated signal may be a signal for reporting coding-related parameters or a signal for reporting transmission parameters. The location of the dedicated signal's resources may be reported to the receiving node in a control signal, or may be determined in advance. For example, the symbol next to the last symbol of a control signal may be used, or an offset may be applied to the last symbol of the control signal. Note that the RV detection illustrated in FIG. 29 is an example, and other coding-related parameters may be detected as well.

Figure 30:
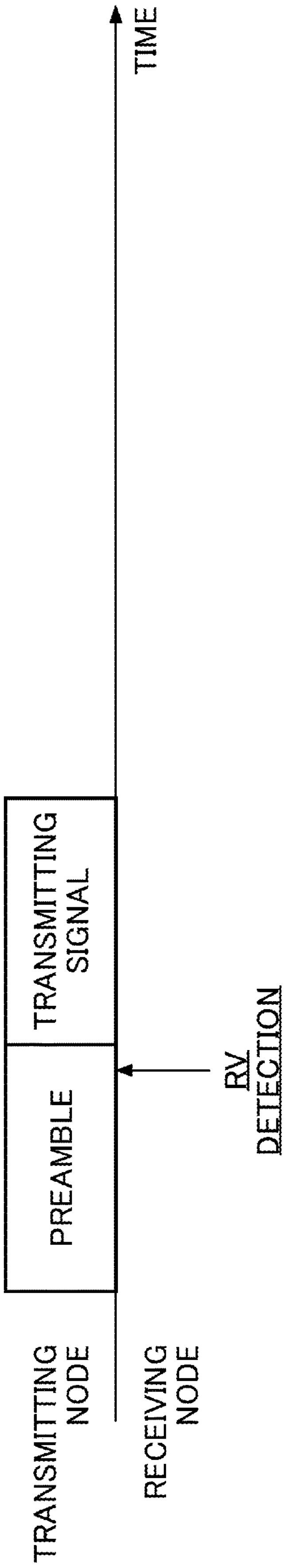
FIG. 30 is a diagram that illustrates an example (3) of coding-related parameter reporting according to an embodiment of the present invention.

FIG. 30 is a diagram that illustrates an example (3) of coding-related parameter reporting according to an embodiment of the present invention. As illustrated in FIG. 30, parameters related to a data signal's resources may be reported to the receiving terminal in a preamble. Also, parameters related to a data signal's resources may be reported to the receiving terminal in a control signal as well. Note that the RV detection illustrated in FIG. 30 is an example, and other coding-related parameters may be detected as well.

Figure 31:
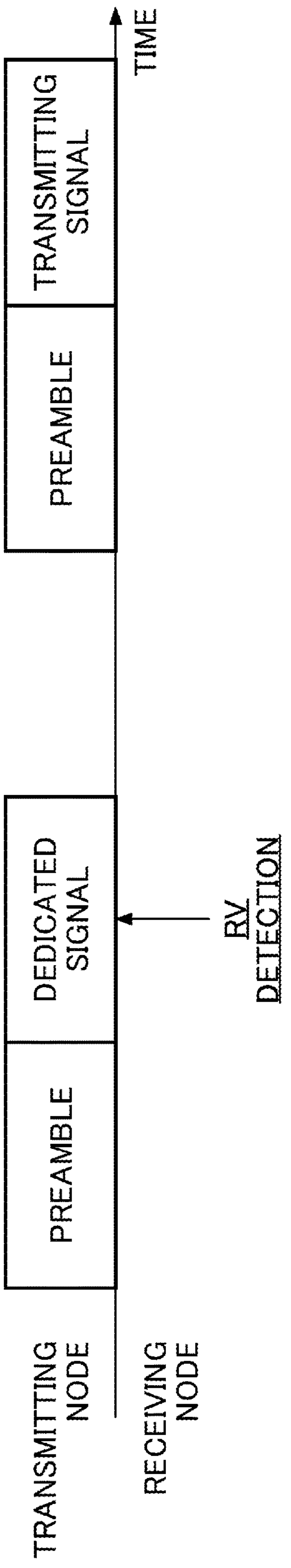
FIG. 31 is a diagram that illustrates an example (4) of coding-related parameter reporting according to an embodiment of the present invention.

FIG. 31 is a diagram that illustrates an example (4) of coding-related parameter reporting according to an embodiment of the present invention. As illustrated in FIG. 31, parameters related to coding of a data signal may be reported to the receiving terminal in a dedicated signal. Meantime, it is also possible to transmit signals discontinuously, such as transmitting a preamble followed by a dedicated signal, transmitting a preamble followed by a transmitting signal, and so on. Note that the RV detection illustrated in FIG. 31 is an example, and other coding-related parameters may be detected as well.

Figure 32:
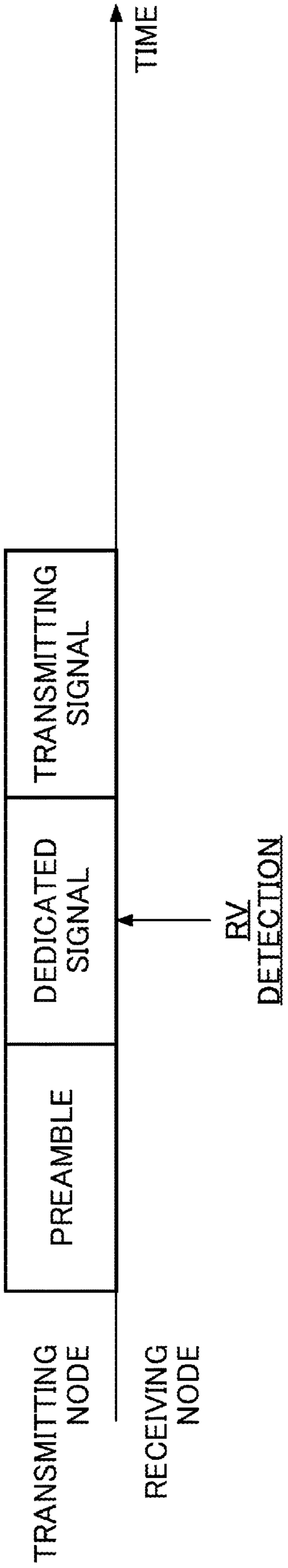
FIG. 32 is a diagram that illustrates an example (5) of coding-related parameter reporting according to an embodiment of the present invention.

FIG. 32 is a diagram that illustrates an example (5) of coding-related parameter reporting according to an embodiment of the present invention. As illustrated in FIG. 32, parameters related to coding of a data signal may be reported to the receiving terminal in a dedicated signal. Meantime, it is also possible to transmit signals continuously in order, such as transmitting a preamble followed by a dedicated signal, transmitting a transmitting signal following the dedicated signal, and so on. Note that the RV detection illustrated in FIG. 32 is an example, and other coding-related parameters may be detected as well.

The spatial information will be described below. A preamble, a control signal, a reference signal, and a synchronization signal may be associated with an antenna port, which represents spatial information, or the spatial information may be reported to the nodes.

Table 7 is an example configuration for antenna port reporting.

TABLE 7

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

As shown in Table 7, an antenna port may be reported by using an index, with at least the number of code division multiplexing (CDM) groups that form a reference signal. Multiple index tables may be defined. That is, it is possible to define multiple candidate tables, and define combinations of different numbers of CDM groups and antenna port sets. Also, which table is applied may be determined based on any of a higher layer parameter, a control signal, a preamble, a dedicated signal, and RNTI.

Figure 33:
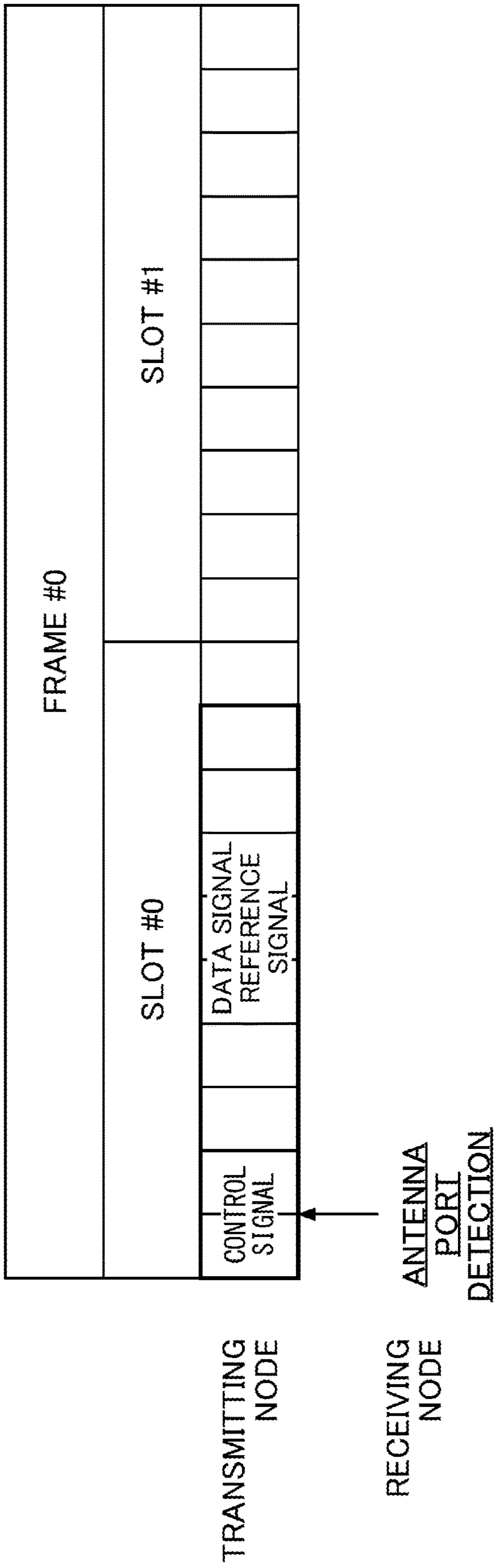
FIG. 33 is a diagram that illustrates an example (1) of antenna port reporting according to an embodiment of the present invention.

FIG. 33 is a diagram that illustrates an example (1) of antenna port reporting according to an embodiment of the present invention. As illustrated in FIG. 33, the antenna port of a data signal or a reference signal may be reported to the receiving terminal in a control signal.

Figure 34:
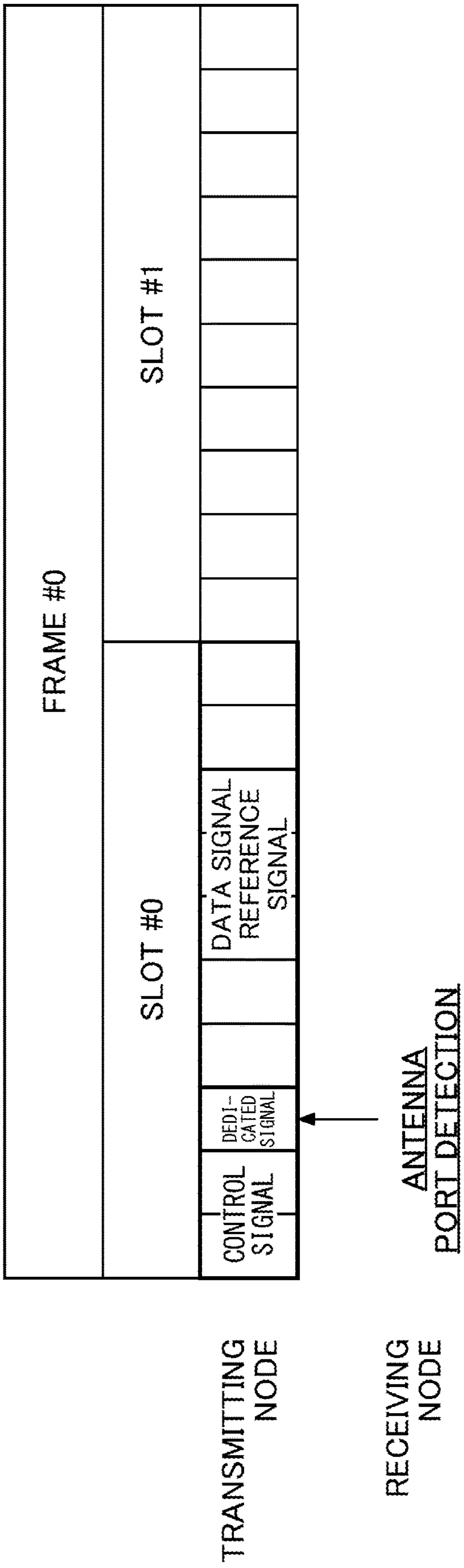
FIG. 34 is a diagram that illustrates an example (2) of antenna port reporting according to an embodiment of the present invention.

FIG. 34 is a diagram that illustrates an example (2) of antenna port reporting according to an embodiment of the present invention. As illustrated in FIG. 34, the antenna port of a data signal or a reference signal may be reported to the receiving terminal in a dedicated signal other than a control signal or the data signal. The dedicated signal may be a signal for reporting antenna ports or a signal for reporting transmission parameters. The location of the dedicated signal's resources may be reported to the receiving node in a control signal, or may be determined in advance. For example, the symbol next to the last symbol of a control signal may be used, or an offset may be applied to the last symbol of the control signal.

Figure 35:
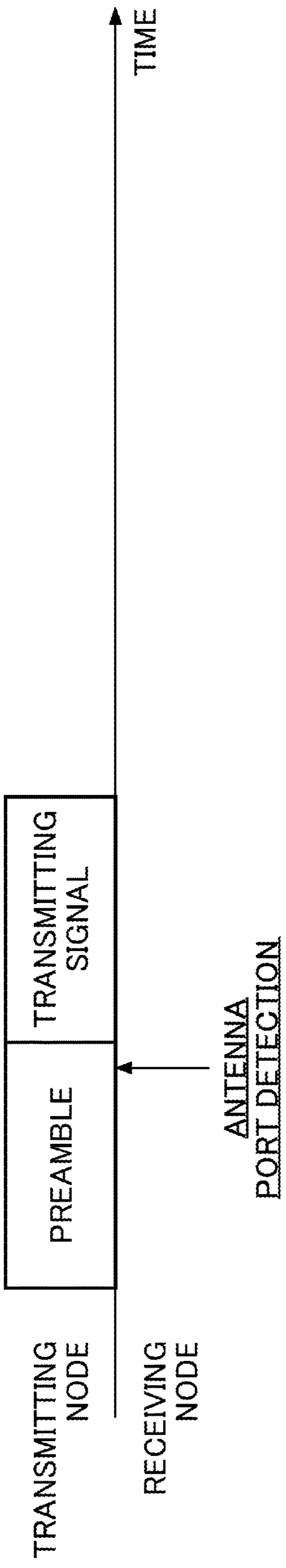
FIG. 35 is a diagram that illustrates an example (3) of antenna port reporting according to an embodiment of the present invention.

FIG. 35 is a diagram that illustrates an example (3) of antenna port reporting according to an embodiment of the present invention. As illustrated in FIG. 35, the antenna port of a data signal or a reference signal may be reported to the receiving terminal in a preamble. Also, the antenna port of a data signal or a reference signal may be reported to the receiving terminal in a control signal.

Figure 36:
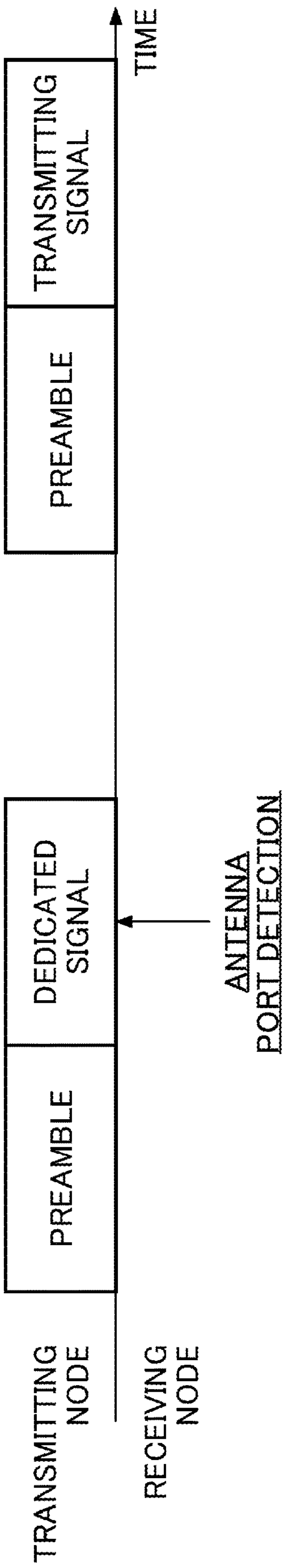
FIG. 36 is a diagram that illustrates an example (4) of antenna port reporting according to an embodiment of the present invention.

FIG. 36 is a diagram that illustrates an example (4) of antenna port reporting according to an embodiment of the present invention. As illustrated in FIG. 36, the antenna port of a data signal or a reference signal may be reported to the receiving terminal in a dedicated signal. Meantime, it is also possible to transmit signals discontinuously, such as transmitting a preamble followed by a dedicated signal, transmitting a preamble followed by a transmitting signal, and so on.

Figure 37:
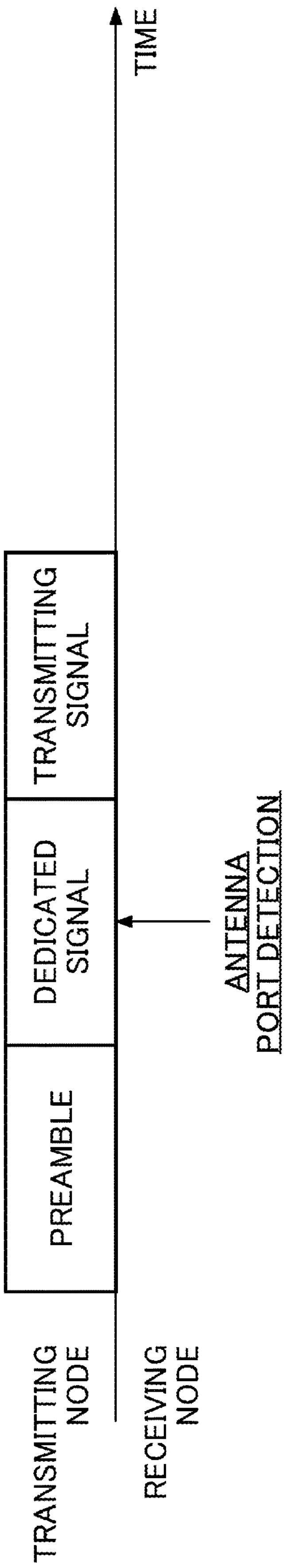
FIG. 37 is a diagram that illustrates an example (5) of antenna port reporting according to an embodiment of the present invention.

FIG. 37 is a diagram that illustrates an example (5) of antenna port reporting according to an embodiment of the present invention. As illustrated in FIG. 37, the antenna port of a data signal or a reference signal may be reported to the receiving terminal in a dedicated signal. Meantime, it is also possible to transmit signals continuously in order, such as transmitting a preamble followed by a dedicated signal, transmitting a transmitting signal following the dedicated signal, and so on.

Note that the spatial information may be defined by a concept other than antenna ports (for example, physical antenna IDs), and may be read interchangeably with the above "antenna ports."

Parameters for control signals will be described below. Parameters for receiving a control signal may be reported in a preamble. The control signal's resources may be reported as a parameter. The control signal's frequency domain resources may be reported in a preamble, by any of following methods 1) to 4):

- Method 1) The starting point and length of the control signal's frequency domain resources may be designated in a predetermined unit of measurement. This predetermined unit of measurement may be RE, RB, RB set, BWP, or CC;
- Method 2) Resource allocation information may be reported per first unit of measurement, in a second unit of measurement. For example, the allocation information may be reported in bitmaps, per BWP allocated to the node, that is, per first unit of measurement, in units of 2 RBs, that is, in a second unit of measurement. Also, the allocation information may be reported in bitmaps, per BWP allocated to the node, that is, per first unit of measurement, in units of half BWPs, that is, in a second unit of measurement;
- Method 3) A report to indicate that the control signal's frequency domain resources are the same as those of a preamble may be reported; and
- Method 4) Unique resources may be determined for the control signal based on resources of a received preamble signal. For example, half the frequency domain resources of the preamble signal may be allocated to the control signal.

Above method 1), method 2), method 3), and method 4) may be switched by a higher layer, a preamble, or a control signal.

A control signal's time domain resources may be reported in a preamble. The starting point or the length of the time domain resources of the control signal may be indicated by using a predetermined unit of measurement. This predetermined unit of measurement may be the nanosecond, microsecond, millisecond, second, symbol, or slot. As for the starting point, the last symbol of the control signal may be designated the starting point, or the control signal's first or last symbol with an offset may be designated the starting point, or any symbol or slot may be used. Also, the end of a preamble may be designated the starting point, or the preamble's beginning or end with an offset may be designated the starting point. The offset may be defined in advance, configured by a higher layer, or reported in a preamble or a control signal.

A report to indicate that the signal that is going to be received after the preamble is a control signal may be reported. For example, since there are few reporting fields in a preamble, it is possible to assume a case in which only the type of the signal such as a control signal, a reference signal, and a data signal is reported in the preamble.

When preamble reporting is not employed, a control signal's resources may be determined by any one or a combination of following 1) to 5):

1) The control signal's frequency domain resources may be determined in advance (for example, all resources of a BWP or a CC);
2) The control signal's frequency domain resources may be defined by frequency domain resources configured by a higher layer;
3) The control signal's time domain resources may be determined in advance (for example, in nanoseconds, microseconds, milliseconds, seconds, symbols, or slots);
4) The control signal's time domain resources may be configured by a higher layer; and
5) The end of a preamble, or the beginning or end of the preamble with an offset, may be designated the starting point of the control signal's time domain resources (the offset may be defined in advance, may be configured in a higher layer, or may be reported in a preamble or a control signal).

If the modulation scheme for control signals is not fixed, the MCS for the control signal may be reported in the same manner as the MCS for a data signal described above.

Regarding the DMRS for the control signal, the location of reference signal resources for demodulating the control signal may be reported.

Regarding the number of layers of the control signal, when the control signal is transmitted from multiple antennas, the antenna port reporting method described above may be employed.

Regarding the transmitted precoding matrix indicator (TPMI) of the control signal, when the control signal is transmitted from multiple antennas and precoding information of the signal transmitted from each antenna is defined in advance, the antenna port reporting method described above may be employed.

A node may be configured with parameters for receiving control signals. A control signal's frequency domain resources may be configured by any of following method 1) to method 4):

Method 1) The starting point and the length of frequency domain resources may be designated in a predetermined unit of measurement. This predetermined unit of measurement may be RE, RB, RB set, BWP, or CC;

Method 2) Resource allocation information may be configured per first predetermined unit of measurement, in a second predetermined unit of measurement. For example, the allocation information may be reported in bitmaps, per BWP allocated to the node, that is, per first unit of measurement, in units of 2 RBs, that is, in a second unit of measurement. Also, the allocation information may be reported in bitmaps, per BWP allocated to the node, that is, per first unit of measurement, in units of half BWPs, that is, in a second unit of measurement;

Method 3) The control signal's frequency domain resources may be configured the same as a preamble; and Method 4) Unique resources may be determined for the control signal based on resources of a received preamble signal. For example, half the frequency domain resources of the preamble signal may be allocated to the control signal.

Above method 1), method 2), method 3), and method 4) may be switched by a higher layer, a preamble, or a control signal.

A control signal's time domain resources may be configured. The starting point or the length of the time domain resources of a control signal may be configured by using a predetermined unit of measurement. This predetermined unit of measurement may be the nanosecond, microsecond, millisecond, second, symbol, or slot. As for the starting point, the last symbol of the control signal may be designated the starting point, or the control signal's first or last symbol with an offset may be designated the starting point, or any symbol or slot may be used. Also, the end of a preamble may be designated the starting point, or the preamble's beginning or end with an offset may be designated the starting point. The offset may be defined in advance, configured by a higher layer, or reported in a preamble or a control signal.

The occasion to detect the control signal's frequency domain resources may be determined by any or a combination of following 1) and 2):

Method 1) The starting point or the length of the frequency domain resources of a control signal may be configured by using a predetermined unit of measurement. This predetermined unit of measurement may be RE, RB, RB set, BWP, or CC; and Method 2) Resource allocation information may be reported per first unit of measurement, in a second unit of measurement. For example, the allocation information may be reported in bitmaps, per BWP allocated to the node, that is, per first unit of measurement, in units of 2 RBs, that is, in a second unit of measurement. Also, the allocation information may be reported in bitmaps, per BWP allocated to the node, that is, per first unit of measurement, in units of half BWPs, that is, in a second unit of measurement.

The starting point and the length of an occasion to detect the control signal's frequency domain resources may be configured by a higher layer by using a predetermined unit of measurement. The configuration value may vary between different slots. These different values may be achieved by using multiple parameters or offsets.

Multiple occasions may be configured to detecting control signals, or whether a control signal addressed to the present node is going to be received in configured time domain resources may be determined by performing blind detection. The maximum number of times to try blind detection may be limited in a predetermined unit (for example, in slots). This reduces the load of implementation.

If the modulation scheme for control signals is not fixed, the MCS for the control signal may be reported in the same manner as the MCS for a data signal described above.

Regarding the DMRS for the control signal, the location of reference signal resources for demodulating the control signal may be reported.

Regarding the number of layers of the control signal, when the control signal is transmitted from multiple antennas, the antenna port reporting method described above may be employed.

Regarding the transmitted precoding matrix indicator (TPMI) of the control signal, when the control signal is transmitted from multiple antennas and precoding information of the signal transmitted from each antenna is defined in advance, the antenna port reporting method described above may be employed.

Reference signals will be described below. Reference signals may be used to demodulate the control signals or data signals, or may be used to determine parameters. The reference signals may include a demodulation signal (for example, demodulation RS (DM-RS)), a phase noise signal ((phase tracking reference signal (PT-RS)), channel state measurement signals (for example, CSI-RS, SRS, etc.), and so forth. The above-described resource determining methods and reporting methods may be applied to CSI-RS and SRS.

As for the frequency domain resources of the demodulation signal or the phase noise correction signal, predetermined groups may be mapped at predetermined intervals or mapped to freely selected locations. The predetermined groups and the predetermined interval may be defined in REs or RBs. For example, the predetermined groups may be mapped per 2 REs, at 1-RE intervals.

As for the time domain resources of the demodulation signal or the phase noise correction signal, predetermined groups may be mapped at predetermined intervals or may be mapped to freely selected locations. The predetermined groups and the predetermined interval may be defined in symbols or slots. For example, the predetermined groups may be mapped per 2 symbols, at 1-symbol intervals, or may be mapped to the first symbol of the slot, over a length of one slot.

As for the method of determining and reporting the resources for the demodulation signal or the phase noise correction signal, the resources for the demodulation signal or the phase noise correction signal may be determined based on the resources of a control signal or a data signal, a higher layer parameter, a preamble, or reporting by a control signal.

Priority will be described below. A preamble, a control signal, a reference signal, a field signal, and a synchronization signal may be each assigned a priority, or priority information that indicates such priorities at a node may be reported. The node may determine the order of transmission and reception of the preamble or signals based on the priority information. For example, when a low-priority data signal and a high-priority data signal are scheduled to overlap on the time axis, the transmitting node transmits only the data signal of the higher priority.

As for the configuration of priority information, a plurality of values that correspond to respective priorities may be provided, or larger values may indicate higher priorities. For example, when the priority values {0, 1, 2, . . . , X} are provided, these priorities may be: 0<1<2< . . . <X. The maximum value X may be defined in advance, or may be configured in a higher layer.

Regarding the configuration and reporting of priority information, the priority information may be configured by a higher layer, or may be reported to a node in a control signal or a dedicated signal. The priority information may be configured and reported by different methods for each preamble or signal type. For example, the priority of a preamble may be configured by a higher layer, and the priorities of a control signal and a data signal may be reported in the preamble. When a unique combination of a control signal, a data signal, and a feedback signal is determined, priority information may be configured or reported only for a certain signal, and the other signals' priorities may be configured in accordance with this priority information. For example, in the event a control signal, a data signal, and a feedback signal are associated with the same process ID (for example, HARQ process ID), and the priority of the control signal is reported in the preamble, the priorities of the data signal and the feedback signal may be configured in accordance with the priority of the control signal.

Figure 38:
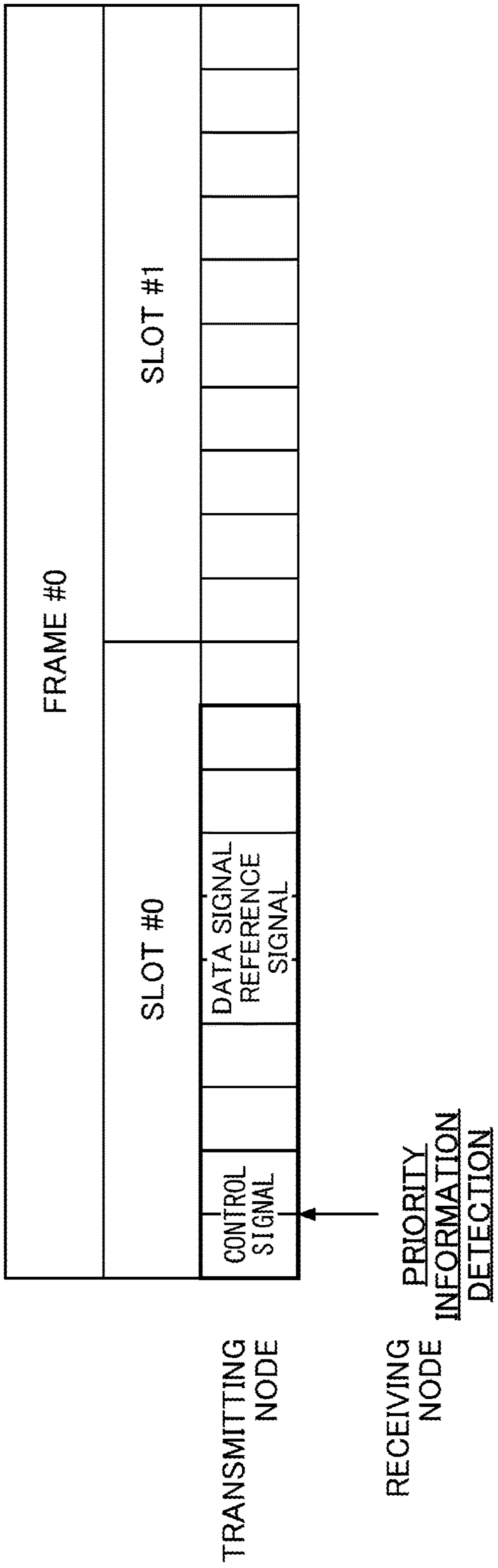
FIG. 38 is a diagram that illustrates an example (1) of priority information reporting according to an embodiment of the present invention.

FIG. 38 is a diagram that illustrates an example (1) of priority information reporting according to an embodiment of the present invention. As illustrated in FIG. 38, priority information of a data signal or a reference signal may be reported to the receiving terminal in a control signal.

Figure 39:
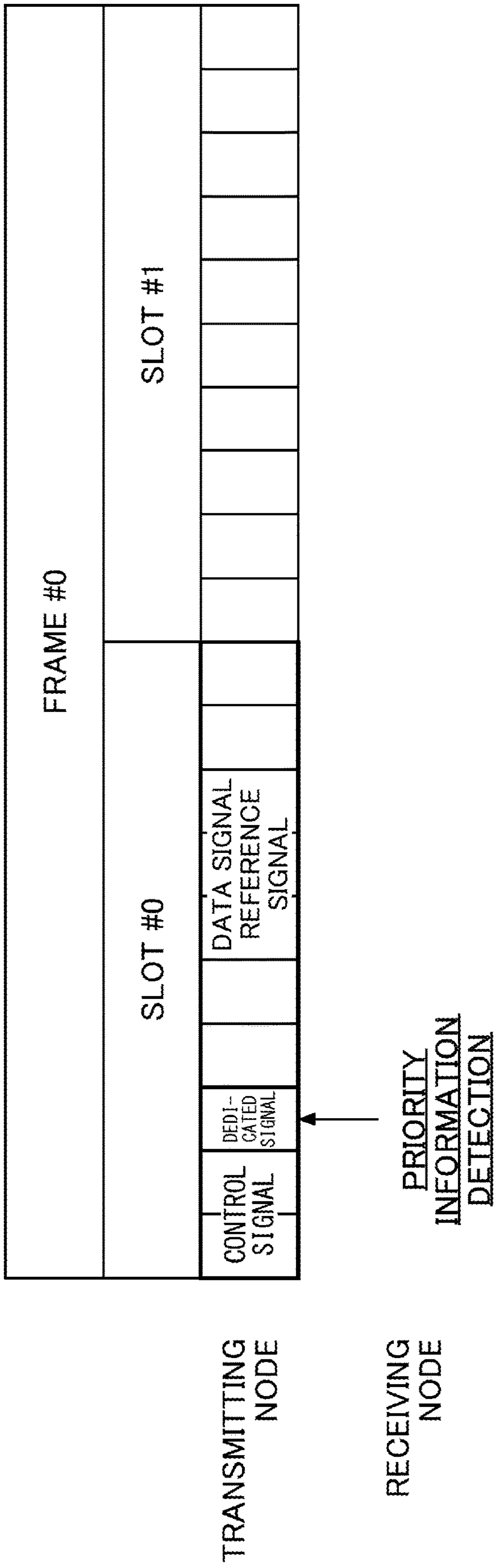
FIG. 39 is a diagram that illustrates an example (2) of priority information reporting according to an embodiment of the present invention.

FIG. 39 is a diagram that illustrates an example (2) of priority information reporting according to an embodiment of the present invention. As illustrated in FIG. 39, priority information of a data signal or a reference signal may be reported to the receiving terminal in a dedicated signal other than a control signal or the data signal. The dedicated signal may be a signal for reporting priority information or a signal for reporting transmission parameters. The location of the dedicated signal's resources may be reported to the receiving node in a control signal, or may be determined in advance. For example, the symbol following the last symbol of a control signal may be used, or an offset may be applied to the last symbol of the control signal.

Figure 40:
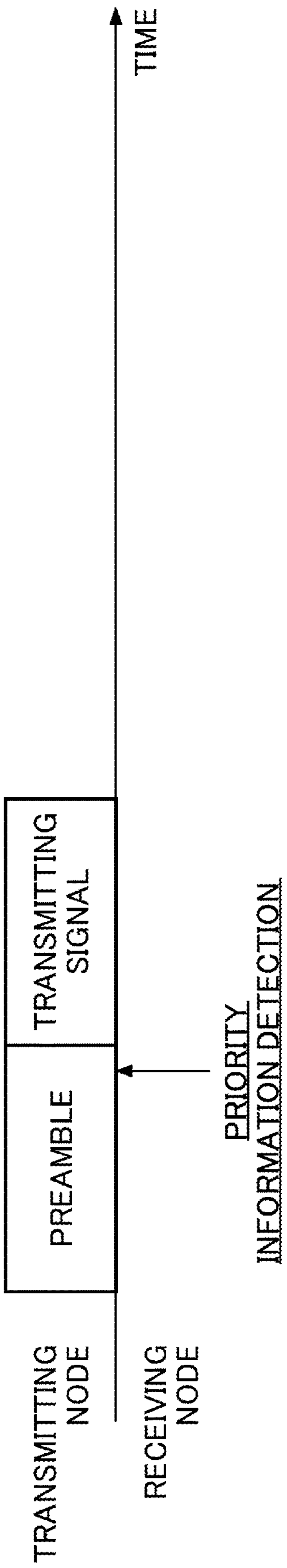
FIG. 40 is a diagram that illustrates an example (3) of priority information reporting according to an embodiment of the present invention.

FIG. 40 is a diagram that illustrates an example (3) of priority information reporting according to an embodiment of the present invention. As shown in FIG. 40, priority information of a data signal or a reference signal may be reported to the receiving terminal in a preamble. Also, the priority information of the data signal or the reference signal may be reported to the receiving terminal in a control signal as well.

Figure 41:
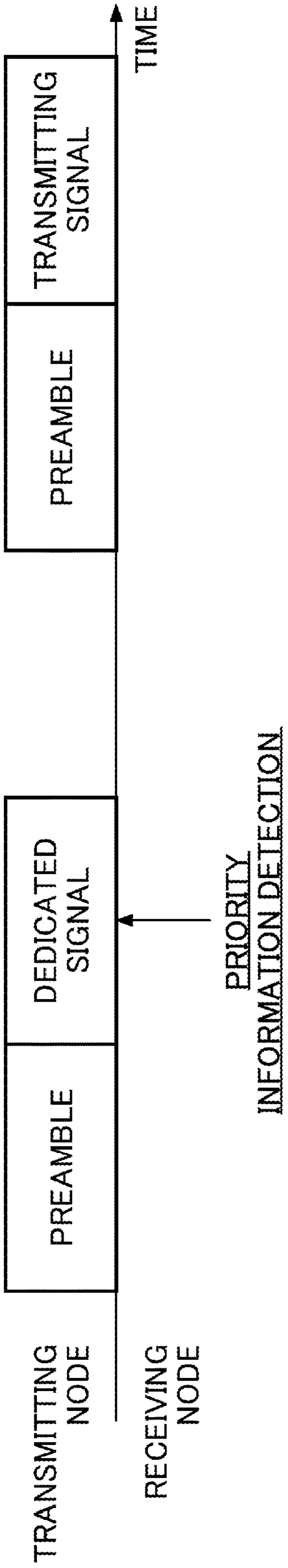
FIG. 41 is a diagram that illustrates an example (4) of priority information reporting according to an embodiment of the present invention.

FIG. 41 is a diagram that illustrates an example (4) of priority information reporting according to an embodiment of the present invention. As illustrated in FIG. 41, priority information of a data signal or a reference signal may be reported to the receiving terminal in a dedicated signal. Meantime, it is also possible to transmit signals discontinuously, such as transmitting a preamble followed by a dedicated signal, transmitting a preamble followed by a transmitting signal, and so on.

Figure 42:
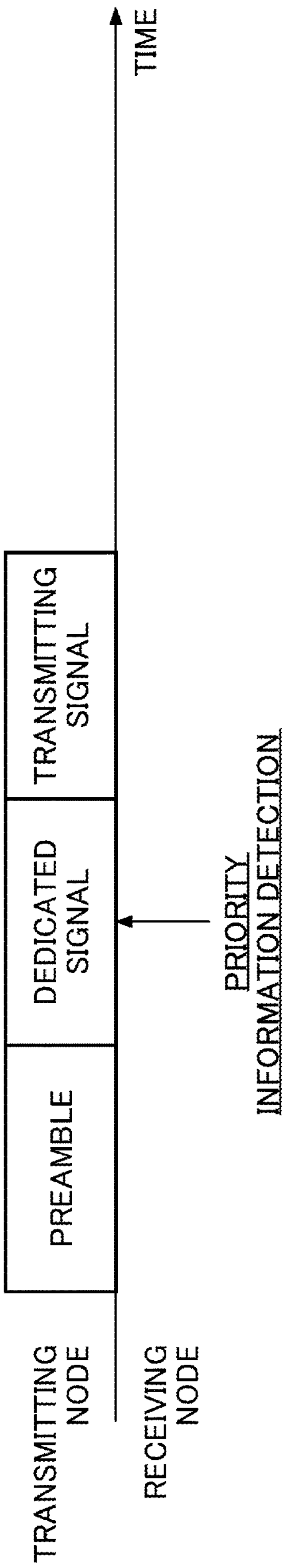
FIG. 42 is a diagram that illustrates an example (5) of priority information reporting according to an embodiment of the present invention.

FIG. 42 is a diagram that illustrates an example (5) of priority information reporting according to an embodiment of the present invention. As illustrated in FIG. 42, priority information of a data signal or a reference signal may be reported to the receiving terminal in a dedicated signal. Meantime, it is also possible to transmit signals continuously in order, such as transmitting a preamble followed by a dedicated signal, transmitting a transmitting signal following the dedicated signal, and so on.

Thus, the above-described embodiment can clarify what operations are involved in determination of transmission parameters in a system in which the base station 10 or the terminal 20 autonomously determines the resources for DL, UL, or SL transmission.

In other words, transmission parameters can be determined in a wireless communication system in which the resources to be used are determined autonomously.

(Device Structure)

Next, an example functional structure of the base station 10 and the terminal 20 for performing the processes and operations described above will be described. The base station 10 and the terminal 20 include functions for executing the embodiment described above. However, each of the base stations 10 and the terminal 20 may include only part of the functions proposed above with respect to the embodiment.

<Base Station 10>

Figure 43:
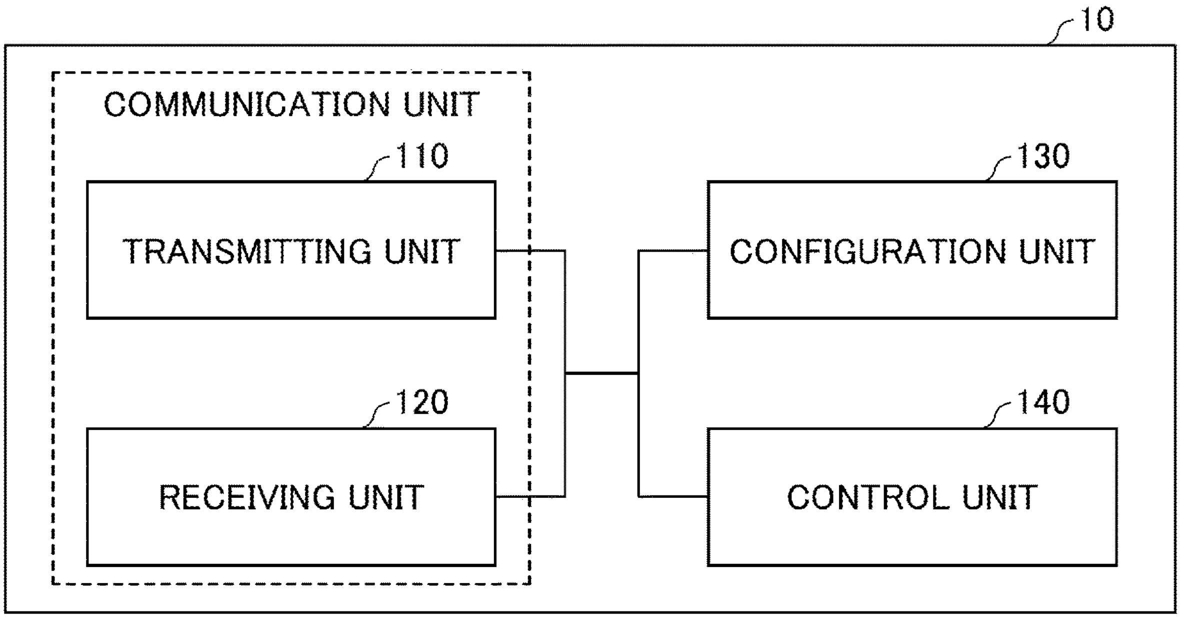
FIG. 43 is a diagram that illustrates an example of a functional structure of a base station 10 according to an embodiment of the present invention.

FIG. 43 is a diagram that illustrates an example functional structure of the base station 10. As illustrated in FIG. 43, the base station 10 includes a transmitting unit 110, a receiving unit 120, a configuration unit 130, and a control unit 140. The functional structure illustrated in FIG. 43 is only one example. If the operation according to the embodiment of the present invention can be performed, any functional categories and any functional unit names may be used. The transmitting unit 110 and the receiving unit 120 may be referred to as "communication units."

The transmitting unit 110 includes a function for generating signals to be transmitted to the terminal 20 side and transmitting the signals wirelessly. The receiving unit 120 includes a function of receiving various signals transmitted from the terminal 20 and acquiring, for example, higher layer information from the received signals. Also, the transmitting unit 110 has a function to transmit NR-PSS, NR-SSS, NR-PBCH, DL/UL control signals, DL data, and so forth, to the terminal 20. Furthermore, the transmitting unit 110 transmits the configuration information described in the embodiment and the like.

The configuration unit 130 stores configuration information that is prepared in advance and various configuration information to be transmitted to the terminal 20, in a storage device, and reads the information from the storage device as needed. The control unit 140 controls the entirety of the base station 10, including control related to signal transmission/reception, control related to LBT, and so forth. Note that a functional unit relating to signal transmission in the control unit 140 may be included in the transmitting unit 110, and a functional unit relating to signal reception in the control unit 140 may be included in the receiving unit 120. The transmitting unit 110 and the receiving unit 120 may be referred to as a "transmitter" and a "receiver," respectively.

<Terminal 20>

Figure 44:
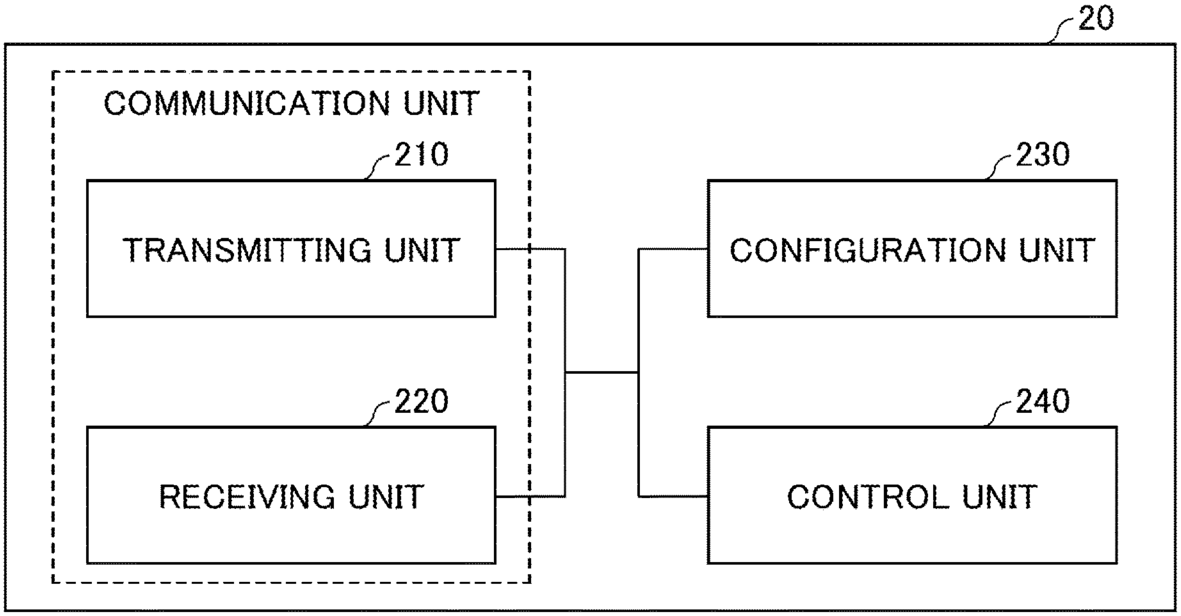
FIG. 44 is a diagram that illustrates an example of a functional structure of a terminal 20 according to an embodiment of the present invention.

FIG. 44 is a diagram that illustrates an example functional structure of the terminal 20. As illustrated in FIG. 44, the terminal 20 includes a transmitting unit 210, a receiving unit 220, a configuration unit 230, and a control unit 240. The functional structure illustrated in FIG. 44 is only one example. Insofar as the operation according to the embodiment of the present invention can be performed, any functional categories and functional unit names may be used. The transmitting unit 210 and the receiving unit 220 may be referred to as "communication units."

The transmitting unit 210 creates transmission signals from the transmission data and transmits the transmission signals wirelessly. The receiving unit 220 receives various signals wirelessly, and acquires signals of higher layers from the received signal of the physical layer. The transmitting unit 210 transmits HARQ-ACK, and the receiving unit 220 receives the configuration information described in the embodiment.

The configuration unit 230 stores various configuration information received from the base station 10 by the receiving unit 220 in the storage device, and reads the stored configuration information from the storage device as needed. The configuration unit 230 also stores the configuration information that is prepared in advance. The control unit 240 controls the entire terminal 20, including control relate to signal transmission and reception and control related to LBT. Note that a functional unit relating to signal transmission in the control unit 240 may be included in the transmitting unit 210, and a functional unit relating to signal reception in the control unit 240 may be included in the receiving unit 220. Also, the transmitting unit 210 and the receiving unit 220 may be referred to as a "transmitter" and a "receiver," respectively.

(Hardware Structure)

The block diagrams (FIG. 43 and FIG. 44) used in the description of the above embodiment illustrate blocks of functional units. These functional blocks (components) are implemented by any combination of hardware and/or software. In addition, the method of implementing each functional block is not particularly limited. That is, each functional block may be implemented by using a single device that is physically or logically combined, or two or more devices that are physically or logically separated may be directly or indirectly connected (for example, by using a cable, radio, etc.), and each functional block may be implemented using these multiple devices. The functional blocks may be implemented by combining software with the device or devices.

The functions include, but are not limited to, judgment, determination, decision, calculation, computation, processing, derivation, research, search, verification, reception, transmission, output, access, resolution, selection, choosing, establishment, comparison, assumption, expectation, deeming, broadcasting, notifying, communicating, forwarding, configuring, reconfiguring, allocating, mapping, and assigning. For example, a functional block (component) that works a transmission function is referred to as a "transmitting unit" or a "transmitter." In either case, as described above, the method of implementation is not particularly limited.

Figure 45:
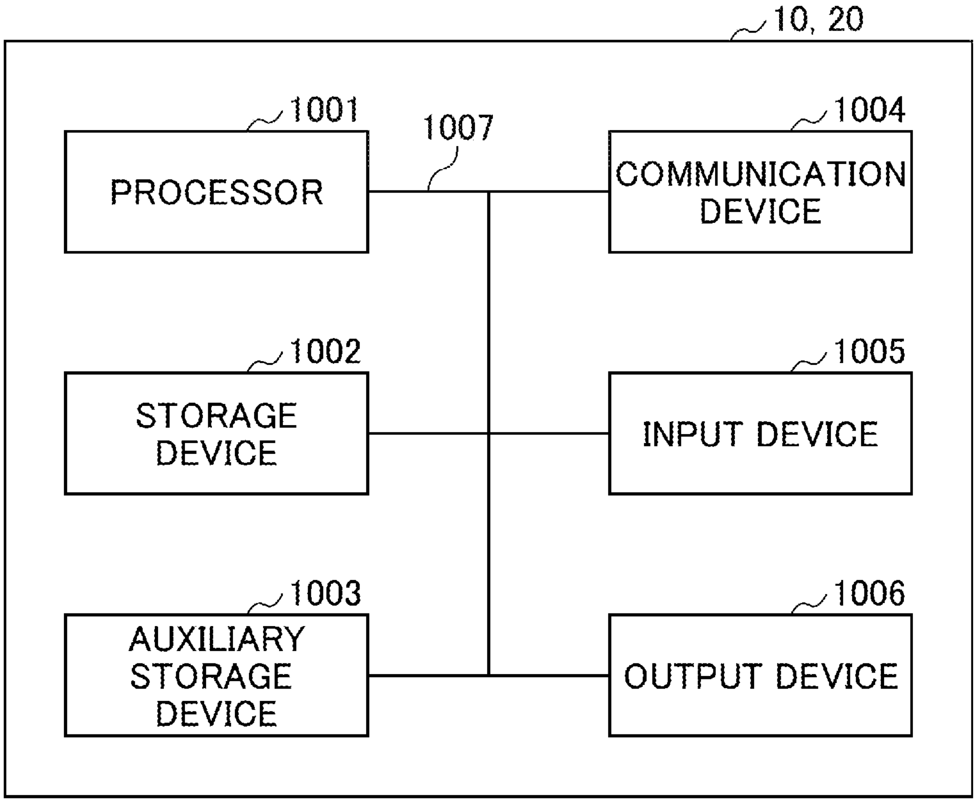
FIG. 45 is a diagram that illustrates an example of a hardware structure of the base station 10 or the terminal 20.

For example, the base station 10, the terminal 20, and so forth according to the embodiment of the present disclosure may function as a computer for processing the wireless communication method of the present disclosure. FIG. 45 is a diagram that illustrates an example hardware structure of the base station 10 and the terminal 20 according to an embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "device" can be read as circuit, apparatus, unit, and so forth. The hardware structure of the base station 10 and the terminal 20 may be configured to include one or more of the devices illustrated in the drawings, or may be configured without some of the devices.

The functions of the base station 10 and the terminal 20 are realized by performing operations by the processor 1001 by reading predetermined software (programs) on hardware such as the processor 1001 and the storage device 1002, and controlling communication by the communication device 1004 and controlling at least one of reading and writing of data in the storage device 1002 and the auxiliary storage device 1003.

The processor 1001 operates, for example, an operating system to control the entire computer. The processor 1001 may be composed of a central processing unit (CPU) including an interface with peripheral devices, a control device, an arithmetic device, a register, and the like. For example, the above-described control unit 140, control unit 240, and the like may be implemented by the processor 1001.

The processor 1001 reads out programs (program codes), software modules, data, or the like from at least one of the auxiliary storage device 1003 and the communication device 1004 to the storage device 1002, and performs various processes in accordance with the above. As for the programs, programs that cause the computer to execute at least part of the operation described in the above embodiment may be used. For example, the control unit 140 of the base station 10 illustrated in FIG. 43 may be stored in the storage device 1002 and implemented by control programs operating in the processor 1001. For example, the control unit 240 of the terminal 20 illustrated in FIG. 44 may be stored in the storage device 1002 and implemented by control programs operating in the processor 1001. Although the foregoing processes have been described and executed by one processor 1001, they may be executed simultaneously or sequentially by two or more processors 1001. The processor 1001 may be implemented by one or more chips. The programs may be transmitted from the network via a telecommunication line.

The storage device 1002 is a computer-readable recording medium and may be composed of at least one of, for example, a read-only memory (ROM), an erasable programmable ROM (EPROM), an electrically erasable programmable ROM (EEPROM), a random access memory (RAM), and the like. The storage device 1002 may be referred to as a register, cache, main memory (main storage device), or the like. The storage device 1002 can store programs (program codes), software modules, and so forth, executable to implement the communication method according to the embodiment of the present disclosure.

The auxiliary storage device 1003 is a computer-readable recording medium and may be composed of at least one of an optical disk, such as a compact disc ROM (CD-ROM), a hard disk drive, a flexible disk, a magneto-optical disk (for example, a compact disc, a digital versatile disc, a Blu-ray disc (registered trademark), etc.), a smart card, a flash memory (for example, a card, a stick, a key drive), a floppy disk (registered trademark), a magnetic strip, and the like. The storage medium described above may be, for example, a database, a server, or other suitable medium that includes at least one of a storage device 1002 and an auxiliary storage device 1003.

The communication device 1004 is hardware (a transceiving device) for performing communication between computers via at least one of a wired network and a wireless network, and is also referred to as a "network device," a "network controller," a "network" card, a "communication module," or the like. The communication device 1004 may be composed of a high frequency switch, a duplexer, a filter, a frequency synthesizer, or the like, for example, to implement at least one of frequency division duplex (FDD) and time division duplex (TDD). For example, the transmitting/receiving antenna, the amplifier unit, the transceiving unit, the transmission line interface, and the like may be implemented by the communication device 1004. The transceiving unit may be physically or logically isolated, respective implementations of a transmitting unit and a receiving unit.

The input device 1005 is an input device (for example, a keyboard, a mouse, a microphone, a switch, a button, a sensor, etc.) that accepts external input. The output device 1006 is an output device (for example, a display, a speaker, an LED lamp, etc.) that implements external output. The input device 1005 and the output device 1006 may have an integral structure (for example, a touch panel).

Each device, such as the processor 1001 and the storage device 1002, is connected by a bus 1007 for communicating information. The bus 1007 may be constructed using a single bus or may be constructed using different buses between devices.

The base station 10 and the terminal 20 may also include hardware such as a microprocessor, a digital signal processor (DSP), an application-specific integrated circuit (ASIC), a programmable logic device (PLD), a field programmable gate array (FPGA), and so forth, and some or all of the functional blocks may be implemented by the hardware. For example, the processor 1001 may be implemented using at least one of these hardware components.

Summary of Embodiment

As described above, according to the embodiment of the present invention, a communication device is provided. This communication device includes: a control unit configured to determine a coding-related parameter to apply to a data signal; and a transmitting unit configured to transmit the determined coding-related parameter, and the data signal to which the coding-related parameter is applied, in autonomously selected resources, to another communication device.

The above structure makes it possible to clarify what operations are involved in determination of transmission parameters in a system in which the base station 10 or the terminal 20 autonomously selects the resources for DL, UL, or SL transmission. That is, transmission parameters can be determined in a wireless communication system in which the resources to be used are determined autonomously.

The coding-related parameter may indicate which bits in a coded bit sequence are transmitted. The above structure makes it possible to clarify what operations are involved in determination of transmission parameters in a system in which the base station 10 or the terminal 20 autonomously selects the resources for DL, UL, or SL transmission.

The coding-related parameter may be an index that indicates an RV (Redundancy Version) and a number of transmissions associated with the RV. The above structure makes it possible to clarify what operations are involved in determination of transmission parameters in a system in which the base station 10 or the terminal 20 autonomously selects the resources for DL, UL, or SL transmission.

The transmitting unit may transmit the coding-related parameter, in a preamble or a dedicated signal, to the another communication device. The above structure makes it possible to clarify what operations are involved in determination of transmission parameters in a system in which the base station 10 or the terminal 20 autonomously selects the resources for DL, UL, or SL transmission.

The transmitting unit may transmit a location of resources in which the dedicated signal is transmitted, to the another communication device. The above structure makes it possible to clarify what operations are involved in determination of transmission parameters in a system in which the base station 10 or the terminal 20 autonomously selects the resources for DL, UL, or SL transmission.

Also, according to an embodiment of the present invention, a communication method that is performed by a communication device is provided. This communication method includes: determining a coding-related parameter to apply to a data signal; and transmitting the determined coding-related parameter, and the data signal to which the coding-related parameter is applied, in autonomously selected resources, to another communication device.

The above structure makes it possible to clarify what operations are involved in determination of transmission parameters in a system in which the base station 10 or the terminal 20 autonomously selects the resources for DL, UL, or SL transmission. That is, transmission parameters can be determined in a wireless communication system in which the resources to be used are determined autonomously.

Notes on Embodiment

An example embodiment of the present invention has been described above, but the disclosed invention is not limited to the above embodiment, and those skilled in the art would understand that there may be various modified examples, revised examples, alternative examples, substitution examples, and the like. In order to facilitate understanding of the invention, specific numerical values have been used for description, but the numerical values are merely examples, and any suitable values may be used unless otherwise specified. The classification of items in the above description is not essential to the present invention. Matters described as two or more items may be combined if necessary, and a matter described as one item may be applied to another item (as long as there is no contradiction). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiment, the order of the processes may be changed as long as there is no contradiction. For the sake of convenience of processing description, the base station 10 and the terminal 20 are described using functional block diagrams, but such devices may be implemented by hardware, software, or a combination thereof. Software executed by the processor included in the base station 10 according to the embodiment of the present invention and software executed by the processor included in the terminal 20 according to the embodiment of the present invention may be stored in a random access memory (RAM), a flash memory, a read-only memory (ROM), an EPROM, an EEPROM, a register, an hard disk drive (HDD), a removable disk, a CD-ROM, a database, a server, or any other appropriate storage medium.

Furthermore, notification of information is not limited to the aspect or embodiment described in the present disclosure, and may be provided by using any other method. For example, the notification of information may be provided by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB), etc.), other signals, or a combination thereof. Furthermore, RRC signaling may be referred to as an "RRC message" and may be, for example, an RRC connection setup message, an RRC connection reconfiguration message, or the like. Each aspect and embodiment described in the present disclosure may be applied to at least one of long-term evolution (LTE), LTE-advanced (LTE-A), SUPER 3G, IMT-Advanced, 4th generation mobile communication system (4G), 5th generation mobile communication system (5G), future radio access (FRA), new radio (NR), W-CDMA (registered trademark), GSM (registered trademark), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using any other appropriate system, and next generation systems enhanced based on these standards. Furthermore, a plurality of systems (for example, a combination of at least one of LTE and LTE-A with 5G) may be combined to be applied.

The order of the processing procedures, the order of the sequences, the order of the flowcharts, and the like of the respective aspects/embodiments described in this specification may be changed, provided that there is no contradiction. For example, the method described in the present disclosure presents elements of various steps with an example order and is not limited to the presented, specific order.

In this specification, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case has been shown above in which there is one network node other than the base station 10. The one network node may be a combination of a plurality of other network nodes (for example, MME and S-GW).

Information, a signal, or the like described in the present disclosure may be output from a higher layer (or from a lower layer) to a lower layer (or to a higher layer). Information, a signal, or the like described in the present disclosure may be input and output via a plurality of network nodes.

Input and output information and the like may be stored in a specific place (for example, a memory), or may be managed by using a management table. Input and output information and the like may be overwritten, updated, or additionally written. Output information and the like may be deleted. Input information and the like may be transmitted to other devices.

The determination in the present disclosure may be made in accordance with a value (0 or 1) represented by one bit, may be made in accordance with a Boolean value (Boolean: true or false), or may be made by a comparison of numerical values (for example, a comparison with a predetermined value).

Software should be broadly interpreted to mean a command, a command set, a code, a code segment, a program code, a program, a subprogram, a software module, an application, a software application, a software package, a routine, a subroutine, an object, an executable file, an execution thread, a procedure, a function, and the like, regardless of whether software is called "software," "firmware," "middleware," a "microcode," a "hardware description language," or any other name.

Furthermore, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL)) and a radio technology (such as infrared rays or a microwave), at least one of these wired technology and radio technology is included in a definition of a transmission medium.

Information, signals, and the like described in the present disclosure may be expressed using any one of a variety of different techniques. For example, data, instructions, commands, information, signals, bits, symbols, chips, and the like, which are mentioned throughout the above description, may be expressed by voltages, currents, electromagnetic waves, magnetic fields or magnetic particles, optical fields or photons, or any combination thereof.

The terms described in the present disclosure and the terms necessary for understanding the present disclosure may be replaced with terms having the same or similar meanings. For example, at least one of a channel and a symbol may be a signal (signaling). Furthermore, a signal may be a message. Furthermore, a component carrier (CC) may be referred to as a "carrier frequency," a "cell," a "frequency carrier," or the like.

The terms "system" and "network" used in the present disclosure are interchangeable.

Furthermore, the information, parameters, and the like described in the present disclosure may be expressed by using absolute values, may be expressed by using relative values from predetermined values, or may be expressed by using any other corresponding information. For example, the radio resources may be those indicated by indices.

The names used for the above-described parameters are not limited names in any point of view. Furthermore, mathematical formulas or the like using the parameters may be different from those explicitly disclosed in the present disclosure. Since various channels (for example, PUCCH, PDCCH, etc.) and information elements can be identified by any suitable names, various names assigned to the various channels and the information elements are not limited names in any point of view.

In the present disclosure, the terms "base station (BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to by a term such as a "macrocell," a "small cell," a "femtocell," and a "picocell."

The base station can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (RRH: Remote Radio Head)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be referred to, by a person ordinarily skilled in the art, as a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client," or some other suitable terms.

At least one of the base station and the mobile station may be also referred to as a "transmission device," a "receiving device," a "communication device," or the like. At least one of the base station and the mobile station may be a device installed in a mobile body, a mobile body itself, or the like. The mobile body may be a vehicle (for example, a car, an airplane, etc.), an unmanned body that moves (for example, a drone, an autonomous car or the like), or a robot (manned type or unmanned type). At least one of the base station and the mobile station includes a device that need not move during communication operation. For example, at least one of the base station and the mobile station may be an Internet of Things (IoT) device such as a sensor.

Furthermore, the base station in the present disclosure may be replaced by the user terminal. For example, various aspects/embodiments of the present disclosure may be applied to a configuration in which communication between the base station and the user terminal is replaced by communication between multiple terminals 20 (such communication may be referred to as "device-to-device (D2D)," "vehicle-to-everything (V2X)," etc.). In this case, the terminals 20 may have and perform the functions the base station 10 described above has. The phrases "uplink" and "downlink" may also be replaced by phrases corresponding to terminal-to-terminal communication (for example, "side"). For example, an uplink channel, a downlink channel, or the like may be replaced by a side channel.

Similarly, the user terminal in the present disclosure may be replaced with the base station. In this case, the base station may have the functions of the above-described user terminal.

The terms "determination (determining)" and "decision (determining)" used in the present specification may include various types of operations. The "determination" and "decision" may include deeming "judging," "calculating," "computing," "processing," "deriving," "investigating," "looking up (for example, searching in a table, a database, or another data structure)," "searching," "inquiring," or "ascertaining" as "determining" and/or "deciding." Furthermore, the "determination" and "decision" may include deeming "receiving (for example, receiving information)," "transmitting (for example, transmitting information)," "inputting," "outputting," or "accessing (for example, accessing data in a memory)" as "determining" and/or "deciding." Furthermore, the "determination" and "decision" may include deeming "resolving," "selecting," "choosing," "establishing," or "comparing" as "determining" and/or "deciding." Namely, the "determination" and "decision" may include deeming an operation as "determining" and/or "deciding." Furthermore, "determining" may be replaced with "assuming," "expecting," "considering," or the like.

The terms "connected," "coupled," or variations thereof may mean any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case of using in the present disclosure, two elements may be considered to be "connected" or "coupled" with each other using at least one of one or more electric wires, cables and/or a printed electrical connection or using electromagnetic energy having a wavelength in a radio frequency region, a microwave region, or a light (both visible and non-visible) region as non-limiting and non-exhaustive examples.

A reference signal may be abbreviated as "RS" and may be referred to as a "pilot," depending on the standard that is applied.

The phrase "based on" used in the present disclosure does not only mean "based only on," unless otherwise stated. In other words, the phrase "based on" means both "based only on" and "based at least on."

Any reference to an element using a designation such as "first" or "second," used in the present disclosure, does not generally restrict quantities or the order of those elements. Such designation can be used in the present disclosure as a convenient method of distinguishing between two or more elements. Thus, reference to the first and second elements does not mean that only two elements can be adopted there, or the first element must precede the second element in a certain way.

Furthermore, "means" in the structure of each of the above devices may be replaced with "unit," "circuit," "device," or the like.

When "include," "including," and variations thereof are used in the present disclosure, these terms are intended to be comprehensive, similar to the term "provided with (comprising)." Furthermore, the term "or" used in the present disclosure is intended not to be an exclusive OR.

A radio frame may include one or more frames in the time domain. In the time domain, each of one or more frames may be referred to as a "subframe." The subframe may further include one or more slots in the time domain. The subframe may have a fixed time length (for example, 1 ms) not depending on numerology.

Numerology may be a communication parameter applied to at least one of transmission and reception of a certain signal or channel. For example, numerology may indicate at least one of subcarrier spacing (SCS), the bandwidth, the symbol length, the cyclic prefix length, the transmission time interval (TTI), the number of symbols per TTI, the radio frame structure, a specific filtering process performed in the frequency domain by a transceiver, a specific windowing process performed in the time domain by a transceiver, and the like.

A slot may include one or more symbols (orthogonal frequency division multiplexing (OFDM) symbols, single carrier frequency division multiple access (SC-FDMA) symbols, etc.) in the time domain. A slot may be a time unit based on numerology.

A slot may include a plurality of mini slots. Each mini slot may include one or more symbols in the time domain. Furthermore, a mini slot may be referred to as a "sub-slot." A mini slot may include fewer symbols than a slot. PDSCH (or PUSCH) that is transmitted in a unit of time greater than a mini slot may be referred to as "PDSCH (or PUSCH) mapping type A." PDSCH (or PUSCH) that is transmitted using a mini slot may be referred to as "PDSCH (or PUSCH) mapping type B."

Any one of a radio frame, a subframe, a slot, a mini slot, and a symbol indicates a time unit for transmitting a signal. As a radio frame, a subframe, a slot, a mini slot, and a symbol, different names corresponding to them may be used.

For example, one subframe may be referred to as a "transmission time interval (TTI)," or a plurality of consecutive subframes may be referred to as a "TTI," or one slot or one mini slot may be referred to as a "TTI." In other words, at least one of the subframe and the TTI may be a subframe (1 ms) in conventional LTE, may be a period shorter than 1 ms (for example, 1 to 13 symbols), or may be a period longer than 1 ms. A unit representing the TTI may be referred to as a "slot," a "mini slot," or the like, instead of a "subframe."

Here, for example, the TTI refers to a minimum time unit of scheduling in wireless communication. For example, in an LTE system, the base station performs scheduling of allocating radio resources (frequency bandwidth, transmission power, or the like which can be used in each terminal 20) to each terminal 20 in units of TTIs. The definition of the TTI is not limited thereto.

The TTI may be a transmission time unit such as a channel-coded data packet (transport block), a code block, or a codeword, or may be a processing unit of, for example, scheduling or link adaptation. Furthermore, when a TTI is provided, the time interval (for example, the number of symbols) in which a transport block, a code block, a codeword, or the like is actually mapped may be shorter than the TTI.

When one slot or one mini slot is referred to as a "TTI," one or more TTIs (that is, one or more slots or one or more mini slots) may be a minimum time unit of scheduling. Furthermore, the number of slots (the number of mini slots) forming the minimum time unit of scheduling may be controlled.

A TTI having a time length of 1 ms may be referred to as a "common TTI" (TTI in LTE Rel. 8 to 12), a "normal TTI," a "long TTI," a "common subframe," a "normal subframe," a "long subframe," a "slot," or the like. A TTI shorter than a common TTI may be referred to as a "reduced TTI," a "short TTI," a "partial TTI" (a partial or fractional TTI), a "reduced subframe," a "short subframe," a "mini slot," a "sub slot," a "slot," or the like.

Furthermore, a long TTI (for example, a normal TTI, a subframe, etc.) may be replaced with a TTI having a time length exceeding 1 ms, and a short TTI (for example, a reduced TTI or the like) may be replaced with a TTI having a TTI length that is shorter than a TTI length of a long TTI and that is longer than or equal to 1 ms.

The resource block (RB) is a resource allocation unit in the time domain and the frequency domain, and may include one or more consecutive subcarriers in the frequency domain. The number of subcarriers included in an RB may be the same, irrespective of the numerology and may be, for example, 12. The number of subcarriers included in an RB may be determined based on numerology.

Furthermore, the time range of an RB may include one or more symbols and may have a length of one slot, one mini slot, one subframe, or one TTI. One TTI, one subframe, or the like may be formed with one or more resource blocks.

Furthermore, one or more RBs may be referred to as a "physical resource block (PRB)," a "subcarrier group (SCG)," a "resource element group (REG)," a "PRB pair," an "RB pair," or the like.

Furthermore, a resource block may be formed with one or more resource elements (REs). For example, one RE may be a radio resource field of one subcarrier and one symbol.

A bandwidth part (BWP) (which may be referred to as a "partial bandwidth" or the like) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include BWP for UL (UL BWP) and BWP for DL (DL BWP). In the terminal 20, one or more BWPs may be configured in one carrier.

At least one of configured BWPs may be active, and the terminal 20 need not assume that predetermined signals/channels are transmitted and received outside an active BWP. Furthermore, a "cell," a "carrier," or the like in the present disclosure may be replaced with a "BWP."

Structures of the radio frame, the subframe, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the cyclic prefix (CP) length, and the like can be variously changed.

In the present disclosure, for example, when an article such as "a," "an," or "the" in English is added by a translation, the present disclosure may include a case in which a noun following the article is the plural.

In the present disclosure, "A and B are different" may mean "A and B are different from each other." However, this may also mean "A and B are different from C." Terms such as "separated" or "combined" may be interpreted as well as "different."

Each aspect/embodiment described in the present disclosure may be used alone, in combination, or may be switched in accordance with the implementation. Furthermore, notification of predetermined information (for example, notification of "being X") is not limited to notification performed explicitly, but may be performed implicitly (for example, not notifying the predetermined information).

Note that, in the present disclosure, the base station 10 and the terminal 20, or the transmitting node and the receiving node are examples of communication devices. CSI-RS is an example of a CSI reference signal.

Although the present disclosure has been described above in detail, it is obvious to those skilled in the art that the present disclosure is not limited to the embodiment described in the present disclosure. The present disclosure may be implemented as revised and modified embodiments without departing from the gist and scope of the present disclosure as set forth in the accompanying claims. Accordingly, the description of the present disclosure is for the purpose of illustration and does not have any restrictive meaning to the present disclosure.

DESCRIPTION OF THE REFERENCE NUMERALS

10 base station
110 transmitting unit
120 receiving unit
130 configuration unit
140 control unit
20 terminal
210 transmitting unit
220 receiving unit
230 configuration unit
240 control unit
30 core network
1001 processor
1002 storage device
1003 auxiliary storage device
1004 communication device
1005 input device
1006 output device

The invention claimed is:

1. A communication device comprising:

a processor configured to determine a coding-related parameter to apply to a data signal; and a transmitter configured to transmit the determined coding-related parameter, and the data signal to which the coding-related parameter is applied, in autonomously selected resources, to another communication device, wherein the processor performs Listen Before Talk (LBT), wherein, in response to the LBT being successful, the transmitter performs transmission of the data signal by attaching a preamble signal to the data signal, wherein, in response to the LBT failing, the processor performs LBT again before a given transmission timing and the transmitter transmits a different data signal from the data signal that was prepared to be transmitted at a time when the LBT failed, wherein the transmitter transmits the coding-related parameter, in a dedicated signal, to the another communication device, wherein the transmitter transmits a location of resources in which the dedicated signal is transmitted, to the another communication device, and wherein the dedicated signal is a signal other than a control signal and the data signal and is dedicated to reporting Modulation and Coding Scheme (MCS).

2. The communication device according to claim 1, wherein the coding-related parameter indicates which bits in a coded bit sequence are transmitted.

3. The communication device according to claim 1, wherein the coding-related parameter is an index that indicates an RV (Redundancy Version) and a number of transmissions associated with the RV.

4. A communication method to be performed by a communication device, the method comprising:

determining a coding-related parameter to apply to a data signal;

transmitting the determined coding-related parameter, and the data signal to which the coding-related parameter is applied, in autonomously selected resources, to another communication device; and performing Listen Before Talk (LBT), wherein, in response to the LBT being successful, the communication device performs transmission of the data signal by attaching a preamble signal to the data signal, wherein, in response to the LBT failing, the communication device performs LBT again before a given transmission timing and transmits a different data signal from the data signal that was prepared to be transmitted at a time when the LBT failed, wherein the communication device transmits the coding-related parameter, in a dedicated signal, to the another communication device, wherein the communication device transmits a location of resources in which the dedicated signal is transmitted, to the another communication device, and wherein the dedicated signal is a signal other than a control signal and the data signal and is dedicated to reporting Modulation and Coding Scheme (MCS).

* * * * *